United States Patent
Wenzel et al.

(10) Patent No.: US 10,447,523 B2
(45) Date of Patent: Oct. 15, 2019

(54) IQ MISMATCH CORRECTION MODULE

(71) Applicant: NXP B.V.

(72) Inventors: Joerg Heinrich Walter Wenzel, Hamburg (DE); Robert Rutten, Nistelrode (NL); Evert-Jan Pol, Son en Breugel (NL); Jan van Sinderen, Liempde (NL); Tjeu van Ansem, Gemert-Bakel (NL); Peter van de Haar, Veldhoven (NL)

(73) Assignee: NXP B.V., Eindhoven (NL)

( * ) Notice: Subject to any disclaimer, the term of this patent is extended or adjusted under 35 U.S.C. 154(b) by 43 days.

(21) Appl. No.: 15/619,259

(22) Filed: Jun. 9, 2017

(65) Prior Publication Data
US 2018/0013604 A1    Jan. 11, 2018

(30) Foreign Application Priority Data
Jul. 6, 2016    (EP) .................................... 16178249

(51) Int. Cl.
| | | |
|---|---|---|
| *H04L 27/36* | (2006.01) | |
| *H04L 1/20* | (2006.01) | |
| *H04L 27/38* | (2006.01) | |

(52) U.S. Cl.
CPC .............. *H04L 27/364* (2013.01); *H04L 1/20* (2013.01); *H04L 27/3863* (2013.01)

(58) Field of Classification Search
CPC ...... H04L 27/364; H04L 27/3863; H04L 1/20
See application file for complete search history.

(56) References Cited

U.S. PATENT DOCUMENTS

| | | | |
|---|---|---|---|
| 7,130,359 B2 * | 10/2006 | Rahman ................. | H03D 3/008 |
| | | | 375/316 |
| 8,280,314 B2 | 10/2012 | Heutmaker et al. | |
| (Continued) | | | |

FOREIGN PATENT DOCUMENTS

| | | |
|---|---|---|
| EP | 2 367 332 B1 | 4/2015 |
| EP | 2 894 823 A1 | 7/2015 |

OTHER PUBLICATIONS

Anttila, L. et al. "Circularity-Based I/Q Imbalance Compensation in Wideband Direct-Conversion Receivers", gIEEE Transactions on Vehicular Technology, vol. 57, No. 4, pp. 2099-2113 (Jul. 2008).
(Continued)

*Primary Examiner* — David B Lugo
(74) *Attorney, Agent, or Firm* — Rajeev Madnawat

(57) ABSTRACT

The disclosure relates to an IQ mismatch correction module for a radio receiver, the IQ mismatch correction module comprising: an input terminal configured to receive an input signal; an output terminal configured to provide a filtered output signal; a mismatch detection module comprising: one or more bandpass filters configured to receive, from the input terminal or output terminal, a bandpass input signal and to pass a plurality of sub-bands of the bandpass input signal to provide respective bandpass filtered signals; one or more amplitude and phase mismatch detectors configured to determine amplitude and phase mismatch coefficients based on the bandpass filtered signals from the plurality of sub-bands; a transformation unit configured to apply a transformation to the amplitude and phase mismatch coefficients to provide correction filter coefficients for the plurality of sub-bands; and a filter module configured to: receive the filter coefficients for the plurality of sub-bands from the mismatch detection module; and filter the input signal in
(Continued)

accordance with the received filter coefficients to provide the filtered output signal.

18 Claims, 24 Drawing Sheets

(56) References Cited

U.S. PATENT DOCUMENTS

| | | | |
|---|---|---|---|
| 8,588,353 B2 | 11/2013 | Yang et al. | |
| 8,811,538 B1 | 8/2014 | Manku | |
| 2003/0206603 A1* | 11/2003 | Husted | H04L 27/3863 375/324 |
| 2004/0219884 A1* | 11/2004 | Mo | H03D 3/009 455/67.11 |
| 2007/0080835 A1 | 4/2007 | Maeda et al. | |
| 2007/0099570 A1 | 5/2007 | Gao et al. | |
| 2010/0008449 A1* | 1/2010 | Sayers | H03D 3/009 375/322 |
| 2011/0222638 A1 | 9/2011 | Park et al. | |
| 2012/0057863 A1* | 3/2012 | Winzer | H04B 10/60 398/3 |
| 2013/0243131 A1 | 9/2013 | An et al. | |
| 2013/0282387 A1* | 10/2013 | Philippe | G10L 19/26 704/500 |
| 2014/0029700 A1 | 1/2014 | Viswanathan | |
| 2015/0117577 A1* | 4/2015 | Valadon | H04L 27/3863 375/350 |
| 2015/0200628 A1* | 7/2015 | Rutten | H04L 27/3863 455/326 |

OTHER PUBLICATIONS

Extended European Search Report for Patent Appln. 16178249.5 (dated Jan. 11, 2017).

* cited by examiner

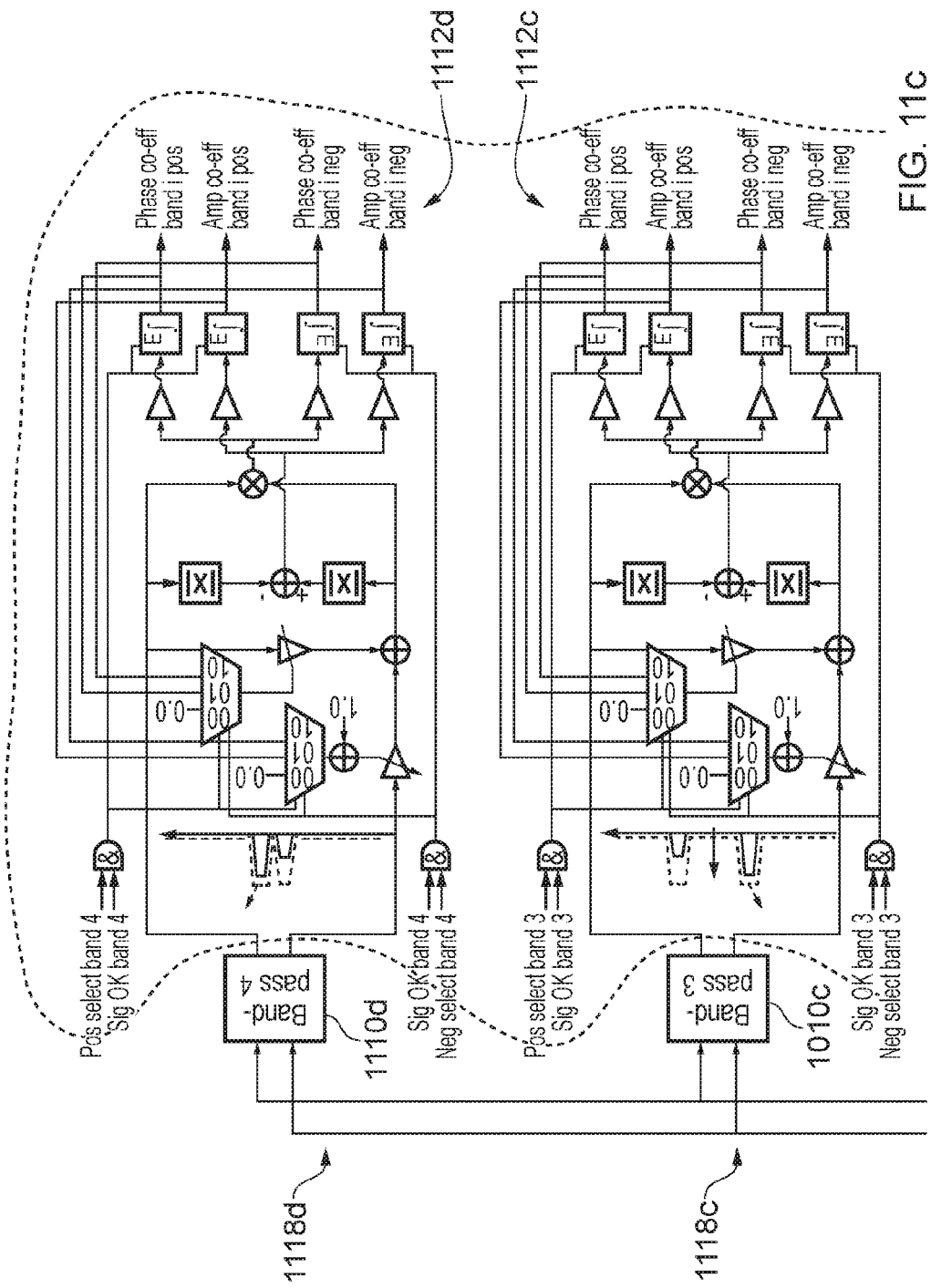

IQ MISMATCH CORRECTION MODULE

CROSS-REFERENCE TO RELATED APPLICATIONS

This application claims the priority under 35 U.S.C. § 119 of European Patent application no. 16178249.5, filed on Jul. 6, 2016, the contents of which are incorporated by reference herein.

This disclosure relates to in-phase/quadrature (IQ) mismatch detection and correction in radio frequency receivers, and in particular, although not exclusively, to an IQ mismatch correction module for a radio frequency receiver.

Modern radio frequency receivers, such as those used for wideband data reception, typically comprise both analogue and digital sections in order to efficiently process signals. A difficulty found in conventional radio frequency receivers relates to providing the required image rejection properties in an efficient manner.

According to a first aspect of the present disclosure there is provided an IQ mismatch correction module for a radio receiver, the IQ mismatch correction module comprising:
  an input terminal configured to receive an input signal;
  an output terminal configured to provide a filtered output signal;
  a mismatch detection module comprising:
    one or more bandpass filters configured to receive, from the input terminal or output terminal, a bandpass input signal and to pass a plurality of sub-bands of the bandpass input signal to provide respective bandpass filtered signals;
    one or more amplitude and phase mismatch detectors configured to determine amplitude and phase mismatch coefficients based on the bandpass filtered signals from the plurality of sub-bands;
    a transformation unit configured to apply a transformation to the amplitude and phase mismatch coefficients to provide correction filter coefficients for the plurality of sub-bands; and
  a filter module configured to:
    receive the filter coefficients for the plurality of sub-bands from the mismatch detection module; and
    filter the input signal in accordance with the received filter coefficients to provide the filtered output signal.

The input signal may be an intermediate frequency signal. The input signal may be a digital domain signal.

The IQ mismatch correction module may comprise a plurality of bandpass filters. Each of the plurality of bandpass filters may be configured to pass a respective sub-band of the plurality of sub-bands in order to provide the bandpass filtered signals from the plurality of sub-bands. The IQ mismatch correction module may comprise a plurality of amplitude and phase mismatch detectors configured to receive, in parallel, the respective bandpass filtered signals. Each of the amplitude and phase detection units may be configured to determine amplitude and phase mismatch coefficients based on the bandpass filtered signals from a respective sub-band of the plurality of sub-bands.

The one or more bandpass filters may comprise a bandpass filter configured to provide the bandpass filtered signals from the plurality of sub-bands by sequentially passing different respective sub-bands of the plurality of sub-bands. The one or more amplitude and phase mismatch detectors may be configured to cyclically generate the amplitude and phase mismatch coefficients by, during each cycle, integrating mismatches as a function of time to provide settled amplitude and phase mismatch coefficients and starting a new cycle following the determination of the settled amplitude and phase mismatch coefficients. The filter module may be configured to be updated periodically based on filter coefficients based on settled mismatch coefficient values.

The one or more amplitude and phase mismatch detectors may be configured to start a new cycle in response to determination of the settled amplitude and phase mismatch coefficients. The one or more amplitude and phase mismatch detectors may be configured to amplify differences prior to integration. The one or more amplitude and phase mismatch detectors may be configured to decrease a gain of the amplification following initiation of an integration cycle.

The mismatch detection module may be configured to calculate a series of filter coefficients based on the settled mismatch coefficient values from one cycle and the settled mismatch coefficient values from the following cycle. The amplitude and phase mismatch detectors may be configured to use determined amplitude and phase mismatch coefficients, or related values, from a previous cycle when determining the amplitude and phase mismatch coefficients for the plurality of sub-band in a current cycle.

The mismatch detection module may comprise one or more automatic gain controllers that are configured to apply a gain factor to the bandpass filtered signals and to provide gain corrected bandpass filtered signals to the one or more amplitude and phase mismatch detectors.

The mismatch detection module may comprise an interpolation/extrapolation unit configured to receive the amplitude and phase mismatch coefficients and to determine further amplitude and phase mismatch coefficients by interpolating and/or extrapolating values based on the received amplitude and phase mismatch coefficients.

The mismatch detection module comprises level detection circuitry or clipped detection circuitry configured to identify positive or negative frequencies associated with a sub-band that contain useful information. Such frequencies may be above a low level threshold. Such frequencies may have positive and negative frequency bands with a difference in signal magnitude that is greater than a distinguishing threshold. The circuitry may be configured to disable coefficient detection for a positive or negative frequency of a sub-band in response to detecting clipping, or saturation. Coefficient detection may be disabled in response to one or more of: the detection of a low signal level for a frequency in a sub-band; the detection of positive and negative frequencies within a sub-band having similar a magnitude within the distinguishing threshold; the detection of clipping of the input signal; or automatic gain control being executed for a sub-band. The mismatch detection module may be configured to generate filter coefficients based on the identified positive or negative frequencies.

The signal level may be averaged over a time period. The level selection circuitry may comprise a first path and a second path. The first path may average signal levels over a shorter time period than the second path. The level detection circuitry may be configured to disable coefficient detection for a positive or negative frequency of a sub-band in accordance with first and second average level values.

The IQ mismatch correction module may comprise a processor and memory storing computer program code executable by the processor to provide the functionality of the mismatch detection module and filter module.

According to a further aspect of the present disclosure there is provided a radio or intermediate frequency receiver comprising the mismatch correction module of any preceding claim.

According to a further aspect of the present disclosure there is provided a method of correcting an IQ mismatch in an input signal, the method comprising:
- receiving the input signal;
- bandpass filtering sub-bands of the input signal or a filtered output signal to provide bandpass filtered signals from a plurality of sub-bands;
- determining amplitude and phase mismatch coefficients based on the bandpass filtered signals from the plurality of sub-bands;
- applying a transformation to the amplitude and phase mismatch coefficients to provide filter coefficients for the plurality of sub-bands;
- filtering the input signal in accordance with the filter coefficients for the plurality of sub-bands to provide a filtered signal.

According to a further aspect of the present disclosure there is provided a non-transient computer-readable storage medium comprising computer program code configured to enable a process to perform the above method.

One or more examples may comprise or relate to:
- blind correction coefficient estimation based on sub-band analysis;
- a correction filter in a feedback structure or outside the coefficient estimation loop (feed-forward structure);
- applying band scans for finding mismatch error coefficients for certain frequency bands by means of band filters or FFT/IFFTs, which could be also activated subsequently;
- band filters (or FFT/IFFT);
- band filters may be optimized for certain signal conditions.
- determining IQ error coefficients per sub-band. Further techniques to improve the error value quality by means of level detectors and helper flags;
- fast level detection to react on fast changing signal conditions and slow level detection to obtain 'average' signal levels. Combination of slow and fast level detection leads to best level indication signal for IQC error detection;
- detecting where strong signals are present (positive or negative band) and doing coefficient detection only for the frequency where the strongest signal level is present;
- disabling coefficient detection when positive and negative band signals have close to identical levels;
- disabling coefficient detection when blocker level is low;
- disabling coefficient detection when input signal clips;
- disabling coefficient detection when course AGC step is executed in the receive chain;
- determining quality of mismatch error using level estimators;
- an AGC sets the band scan output signal per sub-band to such a level that conversion speed is balanced vs accuracy;
- convergence time may be improved by adapting the loop gain of the error estimators during runtime;
- background calculation may be performed while iterating from a high- to a low loop gain;
- convergence time may be improved by continue to next band when error coefficients are found with good quality;
- Translation of found IQ errors into correction filter coefficients;
- bands without error information may be inter/extrapolated;
- frequency IQ mismatch information may be mapped on FIR coefficient, with which the filter may be counteracting the IQ errors;
- FIRMAP could be used to map the errors on FIR correction filter coefficients, which allows to choose frequency bands to specific needs. This method allows to choose frequency bands to specific needs;
- IFFT could be used to map the errors on FIR filter coefficients, which could be hardware re-use from bandscan FFT/IFFT;
- filter coefficients updates may be interpolated to suppress update interference effects; and
- all or parts of processing may be done in hardware and/or software.

The input signal may be a time domain signal. The amplitude and phase mismatch coefficients may be representable by polar coordinates. The transformation may comprise a polar-to-Cartesian coordinate transformation to provide transformed amplitude and phase mismatch coefficients in the frequency domain with a real part and an imaginary part. The transformation may comprise a matrix transformation to act on the transformed amplitude and phase mismatch coefficients and to provide correction filter coefficients.

The filter module may comprise a finite impulse response (FIR) filter. The filter module may be configured to attenuate/amplify frequencies of the input signal in accordance with values of filter coefficients associated with the frequencies in order to provide the output filtered signal. The filter module may be configured to adjust the phase relation between I&Q path for frequencies of the input signal in accordance with values of filter coefficients associated with the frequencies in order to provide the output filtered signal. With small IQ errors the correction filter transfer function is close to an all-pass transfer function.

The IQ mismatch correction module may comprise a controller configured to provide a change sub-band signal in response to:
- the phase mismatch coefficient changing less than a predetermined phase mismatch change value in a predetermined time period; and
- the amplitude mismatch coefficient changing less than a predetermined amplitude mismatch change value in the predetermined time period.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Figure 11A:
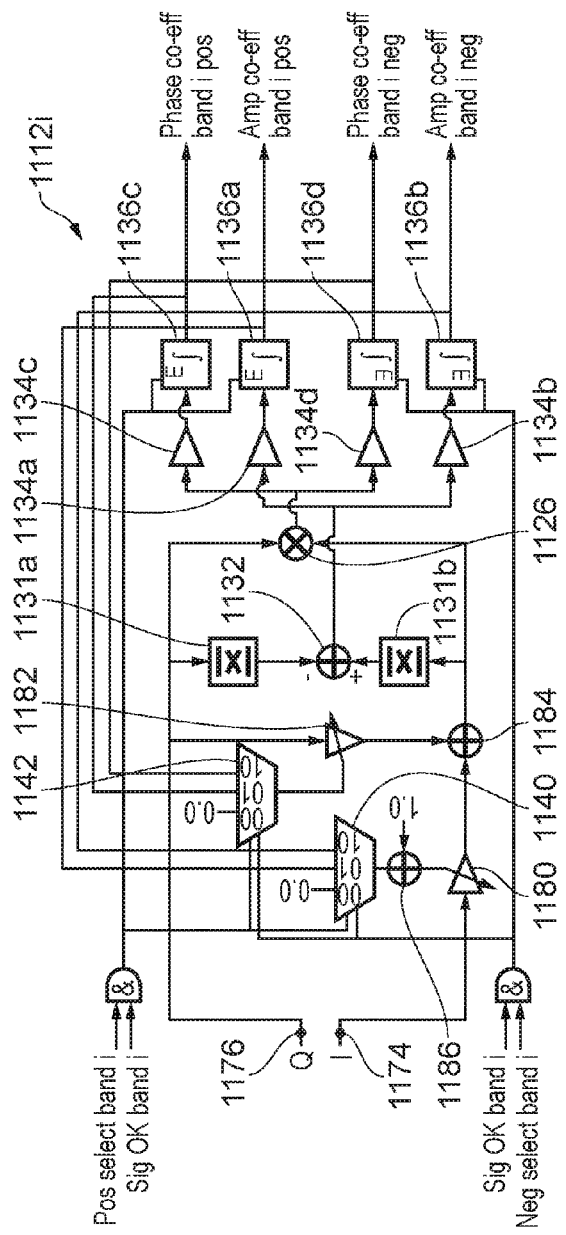
Figure 11B:
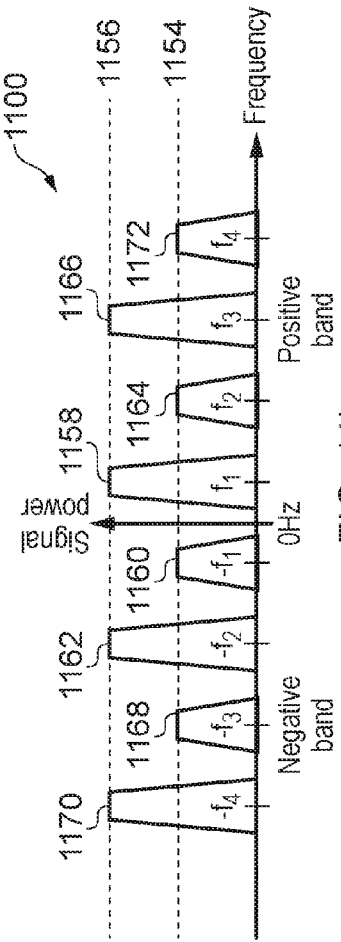
Figure 11C:
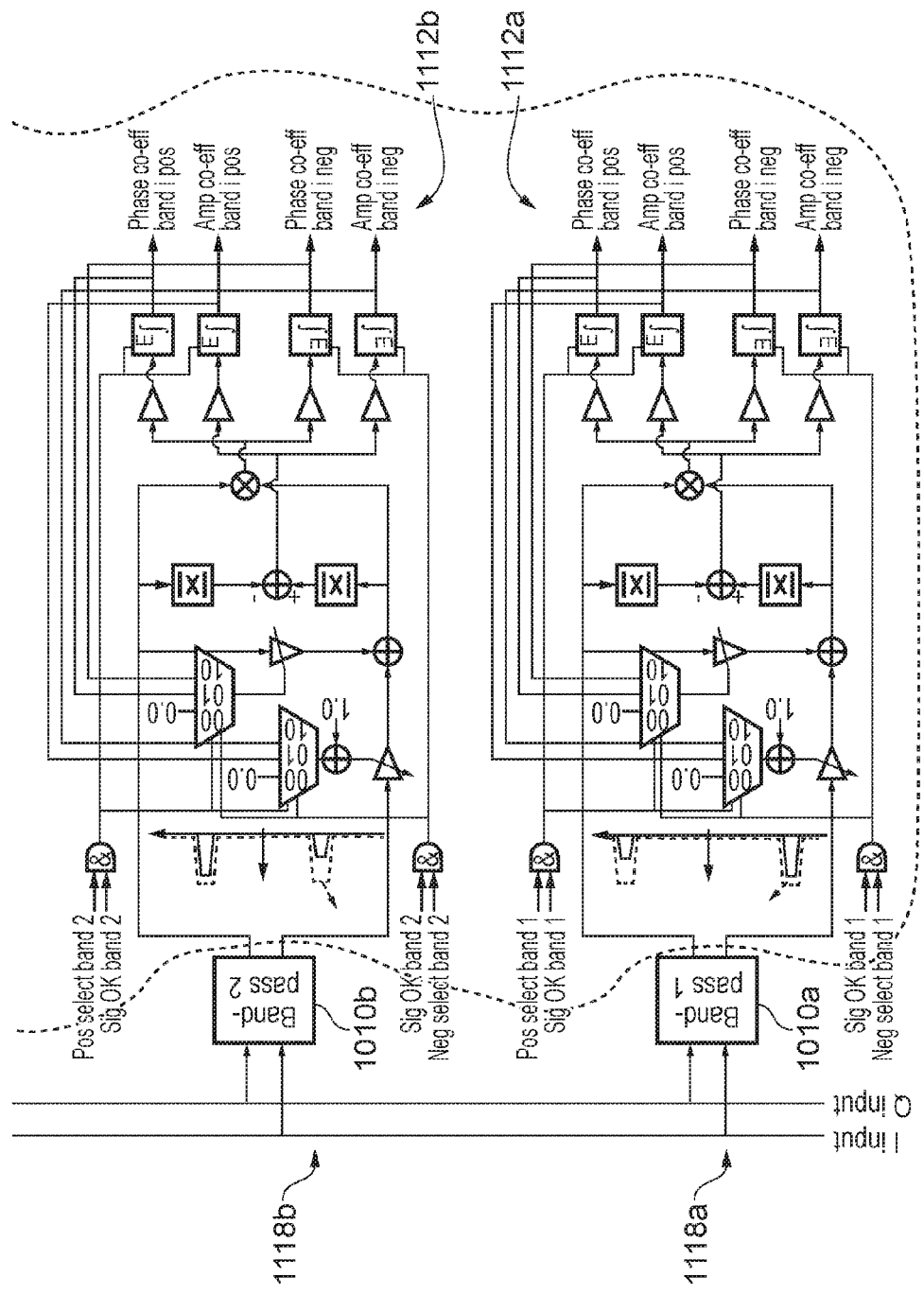
Figure 12:
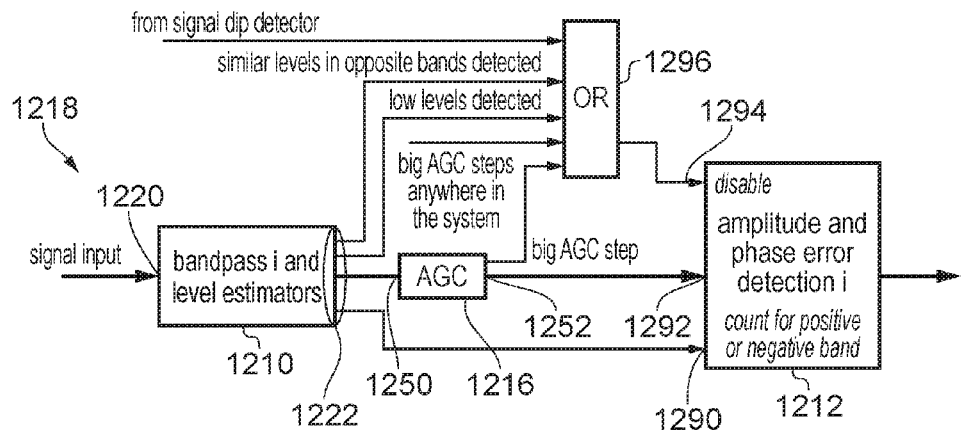
Figure 13A:
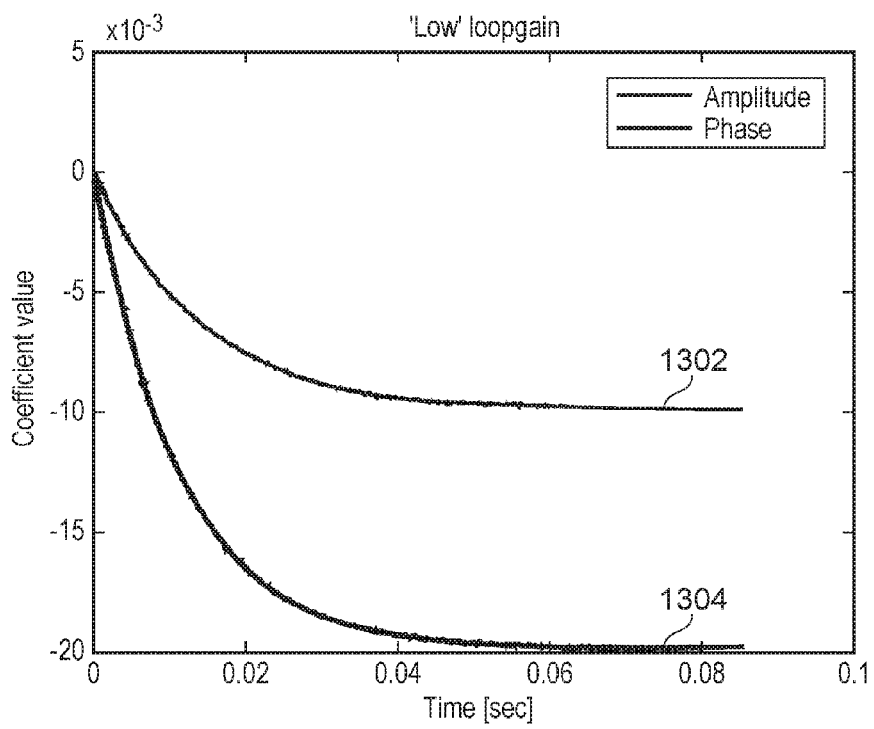
Figure 13B:
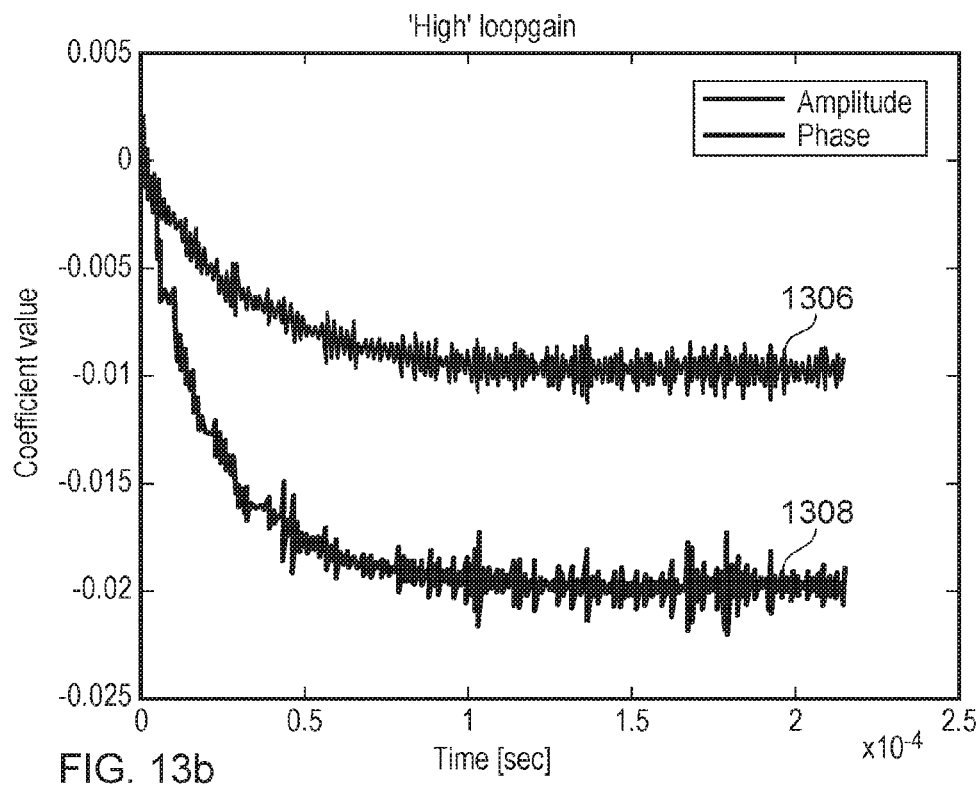
Figure 14:
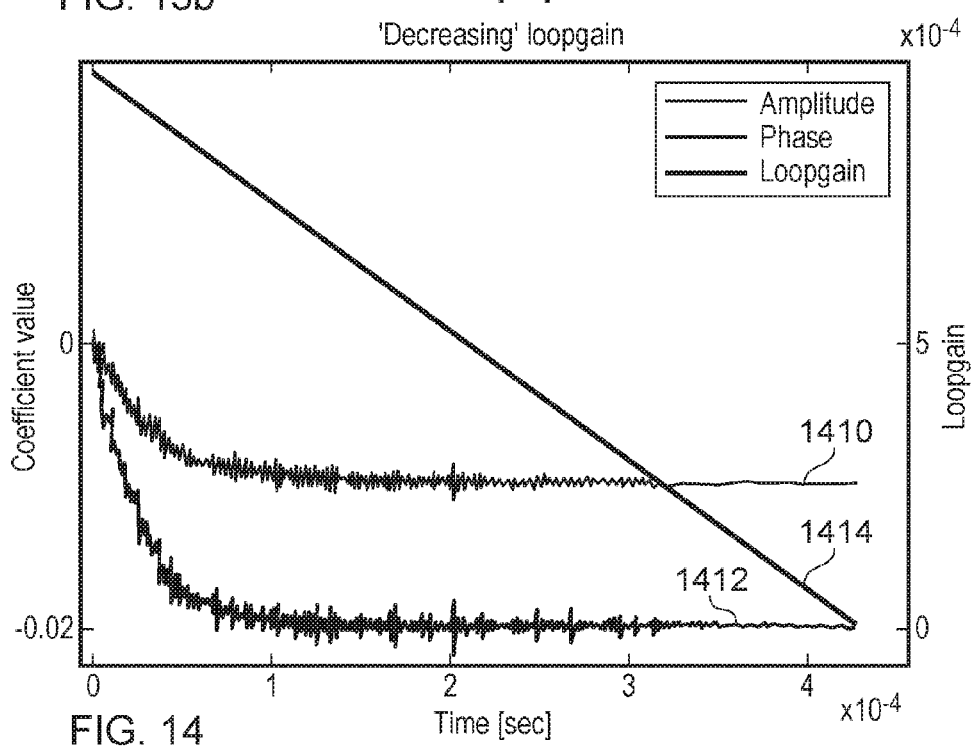
Figure 15A:
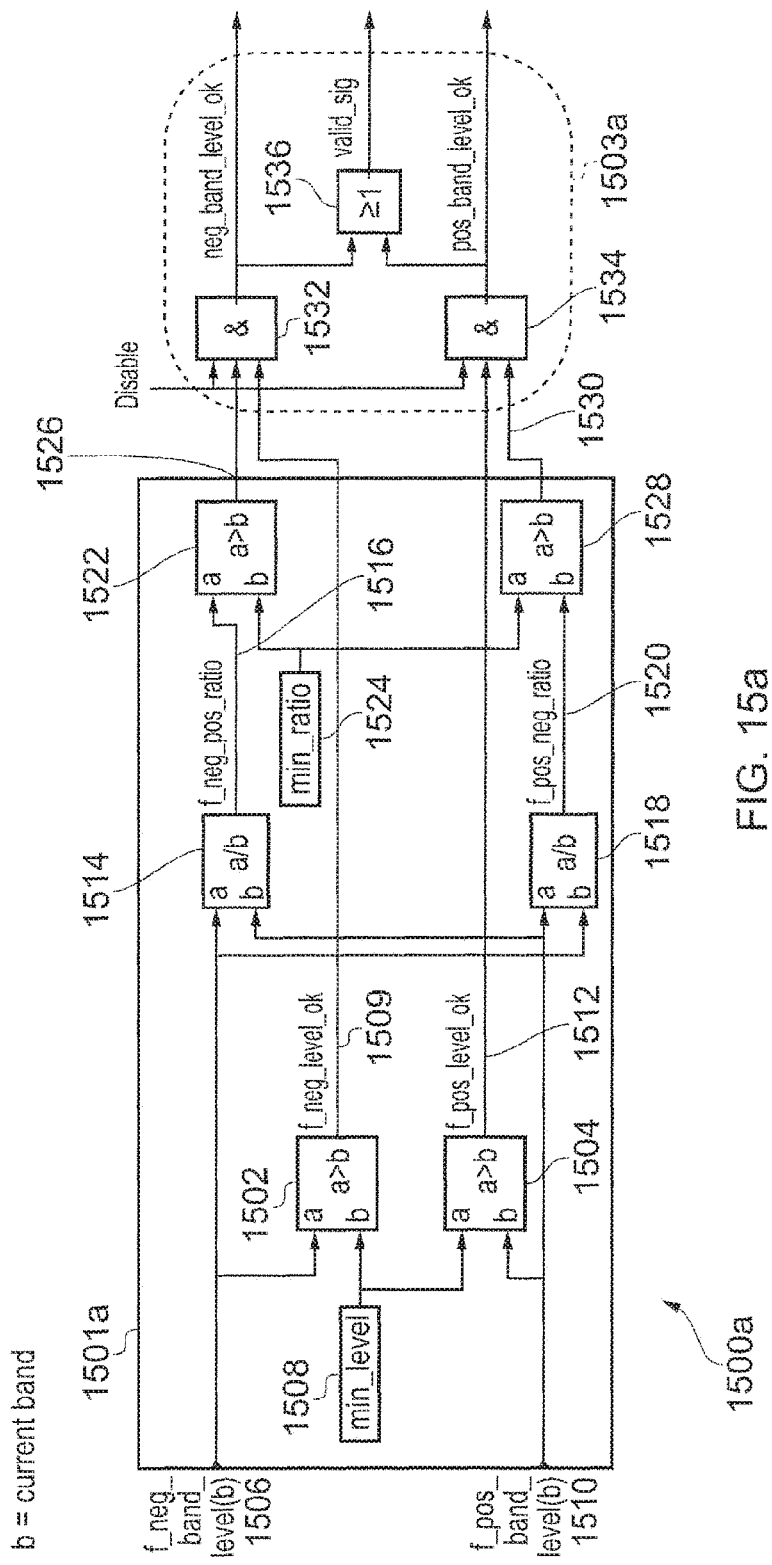
Figure 15B:
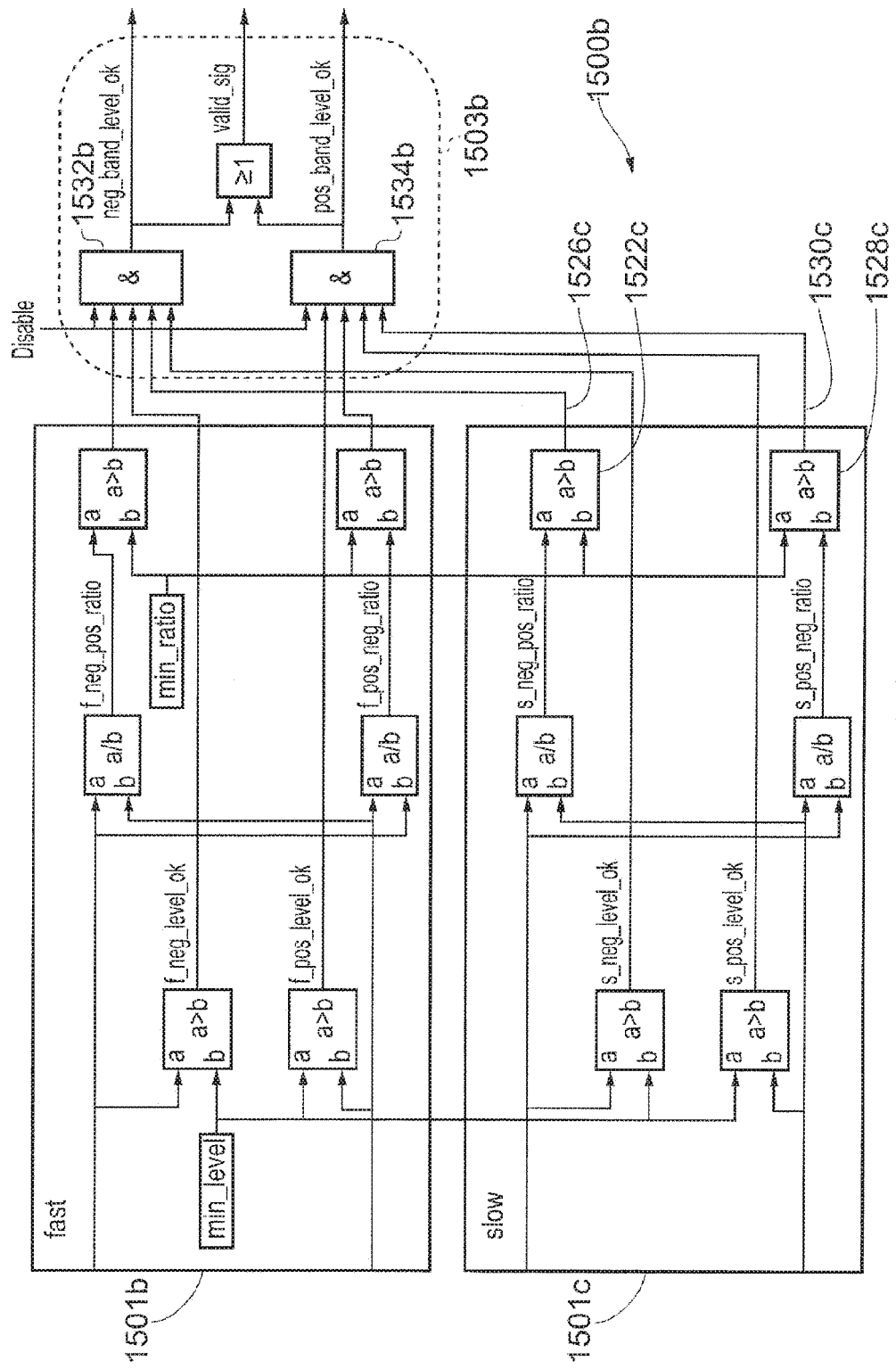
Figure 16:
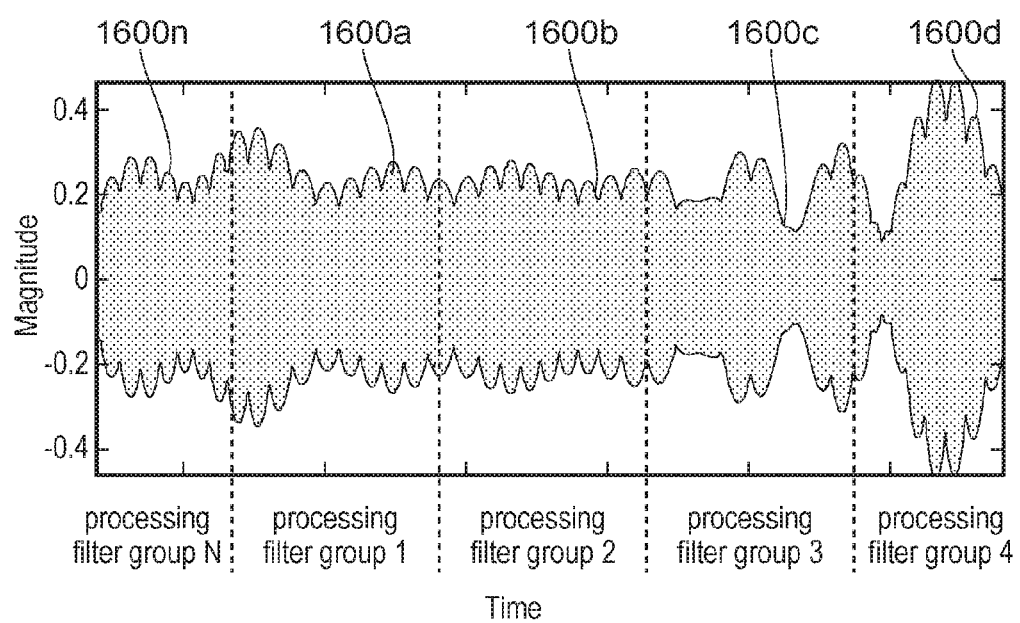
Figure 17:
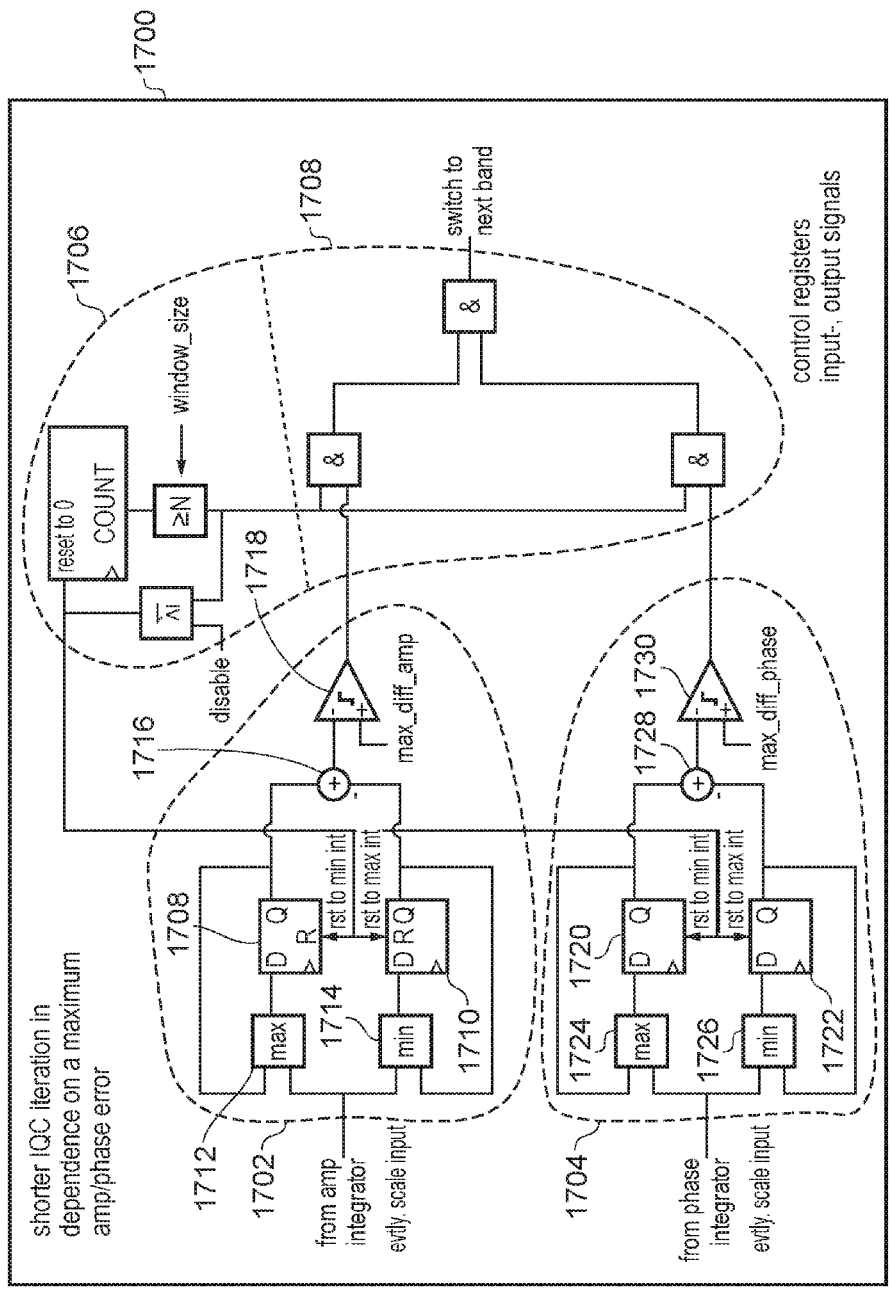
Figure 18:
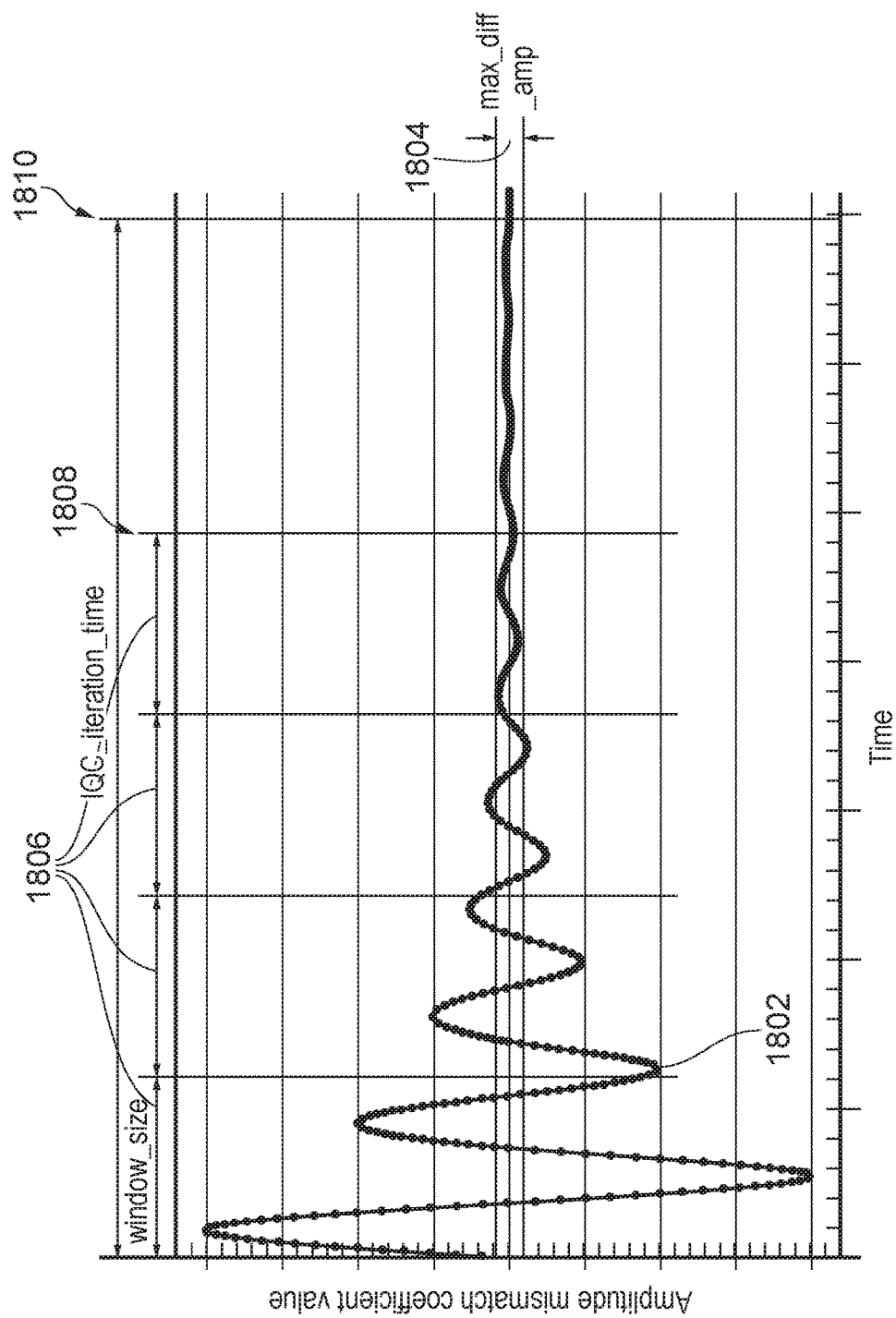
Figure 19:
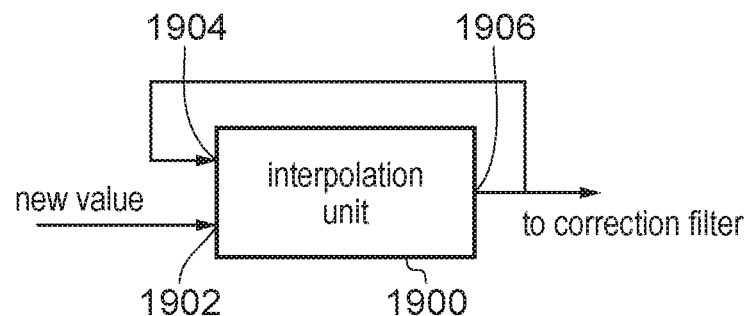
Figure 20:
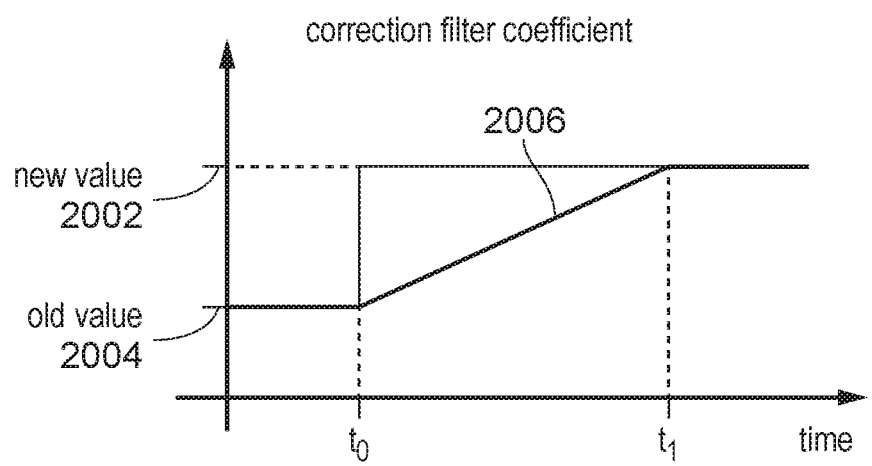
Figure 21:
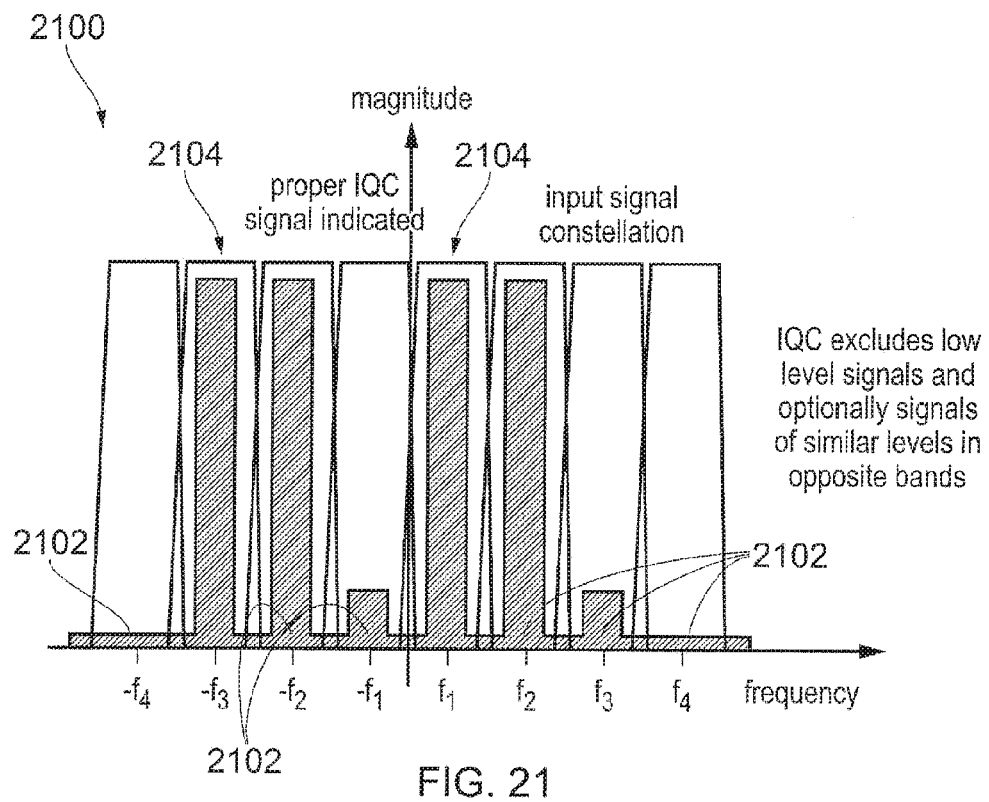
Figure 24:
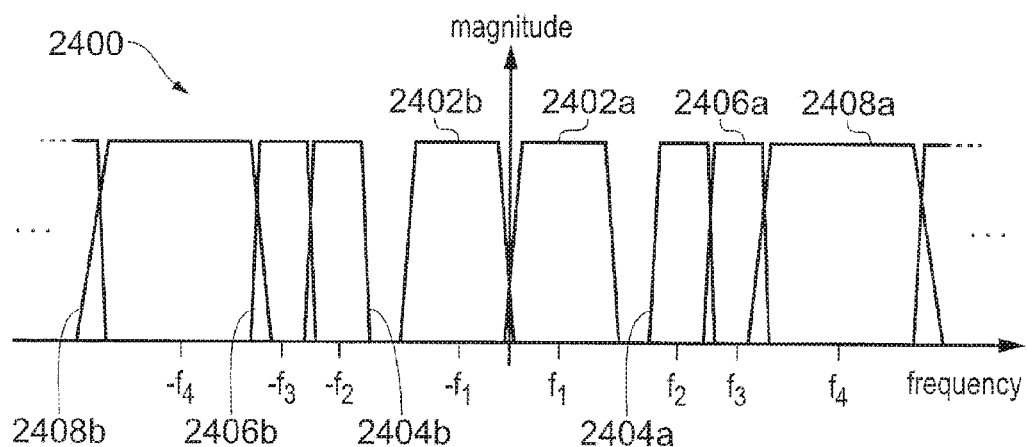
Figure 22:
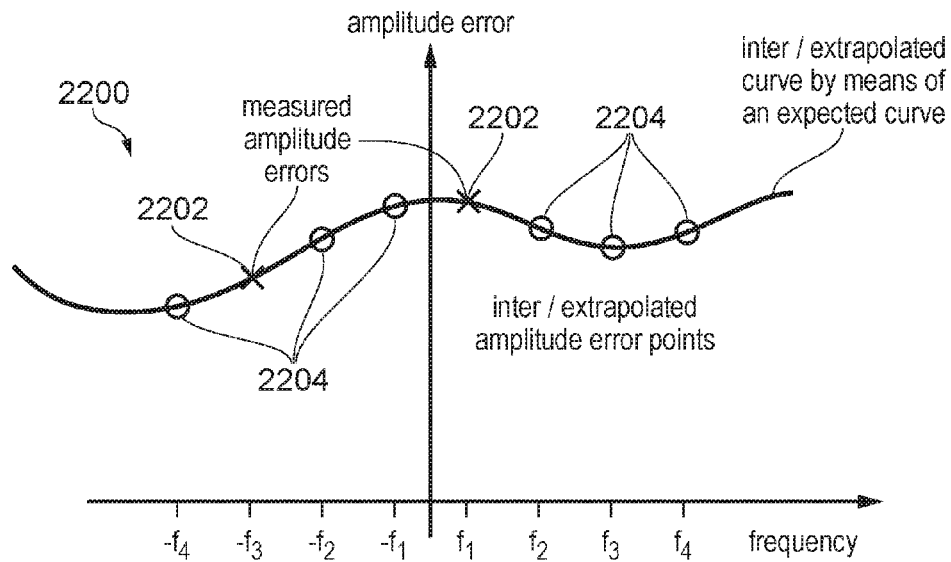
Figure 23:
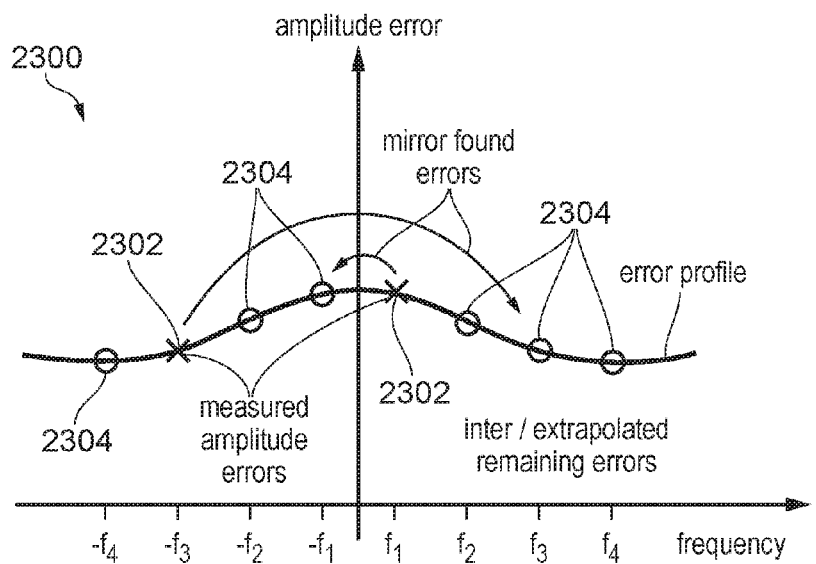

FIGS. 10a to 10f illustrative signals associated with an implementation of the IQ mismatch correction module described previously with respect to FIGS. 5, 8 and 9;

FIGS. 11a and 11c illustrate schematic block diagrams of an example implementation of a phase and amplitude mismatch detector for an IQ mismatch correction module FIG. 11b illustrates an intermediate frequency input signal for the phase and amplitude mismatch detector described with reference to FIGS. 11a and 11c;

FIG. 12 illustrates a schematic block diagram of an example signal path of a phase and amplitude mismatch detector;

FIG. 13a illustrates coefficient mismatch values determined by a mismatch detection module with low loop gain plotted as a function of time;

FIG. 13b illustrates coefficient mismatch values determined by a mismatch detection module with high loop gain plotted as a function of time;

FIG. 14 illustrates coefficient mismatch values determined by a mismatch detection module with a variable loop gain plotted as a function of time;

FIGS. 15a and 15b illustrate schematic block diagrams of example level selectors for a mismatch detection module;

FIG. 16 illustrates a time slicing profile for an IQ mismatch correction module with a sequential processing architecture;

FIG. 17 illustrates a portion of a controller for determining when to set a bandpass filter of a mismatch detection module to pass a different sub-band to a current sub-band;

FIG. 18 illustrates an amplitude mismatch coefficient generated by an amplitude mismatch detector plotted as a function of time;

FIG. 19 illustrates a filter coefficient smooth update interpolation unit;

FIG. 20 illustrates signals associated with the filter coefficient smooth update interpolation unit of FIG. 19 for a particular filter coefficient;

FIG. 21 illustrates a profile of filtered signal magnitude against frequency for a broad bandwidth signal comprising four sub-bands;

FIG. 22 illustrates a profile of amplitude mismatch coefficients plotted against frequency for a broad bandwidth signal comprising four sub-bands;

FIG. 23 illustrates another profile of amplitude mismatch coefficients plotted against frequency for a broad bandwidth signal; and FIG. 24 illustrates a magnitude against frequency profile for an arbitrary IQC bandpass filterbank profile.

Figure 1:
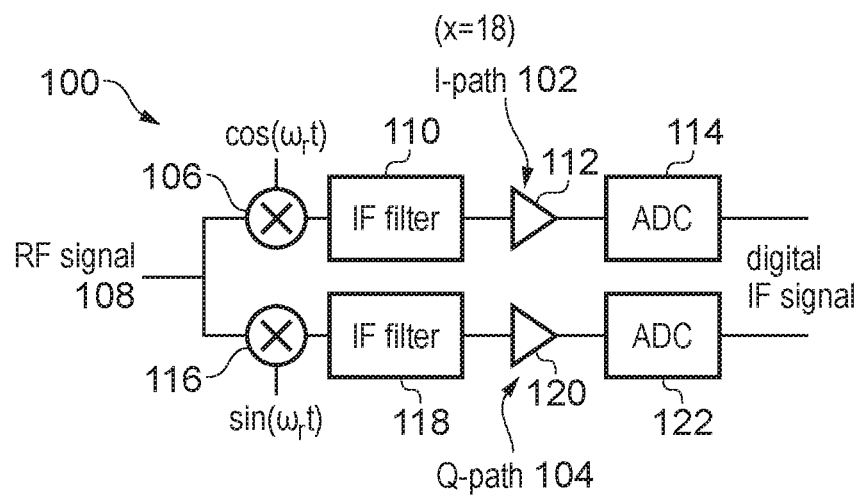
FIG. 1 illustrates a schematic block diagram of a front end of a radio receiver.

FIG. 1 illustrates a schematic block diagram of a front end 100 of a Low- or Zero-intermediate frequency (IF) radio receiver. The front end 100 comprises a quadrature mixer for separating signals into an in-phase path (I-path) 102 and a quadrature phase path (Q-path) 104.

The in-phase path 102 has an in-phase mixer 106 which receives a radio-frequency input signal 108 and selects in-phase components by mixing them with an in-phase cosinusoidal signal $\cos(\omega_r t)$, where $\omega$ (which may also be written as w herein) is the mixer frequency and t is time. The in-phase mixer 106 provides an in-phase mixed-signal to an in-phase intermediate frequency filter 110. The in-phase intermediate frequency filter 110 provides a filtered signal to an in-phase amplifier 112. The in-phase amplifier 112 provides an amplified in-phase signal to an in-phase analogue-to-digital converter 114. The in-phase analogue-to-digital converter 114 provides an in-phase digital domain signal.

The quadrature phase path 104 is provided in parallel with the in-phase path 102. The quadrature phase path 104 has a quadrature phase mixer 116 which receives the radio-frequency input signal 108 and selects quadrature phase components by mixing them with a quadrature phase sinusoidal signal $\sin(\omega_r t)$. The quadrature phase mixer 116 provides a quadrature phase mixed-signal to a quadrature phase intermediate frequency filter 118. The quadrature phase intermediate frequency filter 118 provides a filtered signal to a quadrature phase amplifier 120. The quadrature phase amplifier 120 provides an amplified quadrature phase signal to a quadrature phase analogue-to-digital converter 122. The quadrature phase analogue-to-digital converter 122 provides a quadrature phase digital domain signal.

FIGS. 2a to 2d illustrate representations of frequency bands that may be obtain by the radio receiver of FIG. 1 depending upon its performance characteristics. The frequency bands are illustrated in terms of signal magnitude on a vertical axis, against frequency on a horizontal axis.

Figure 2A:
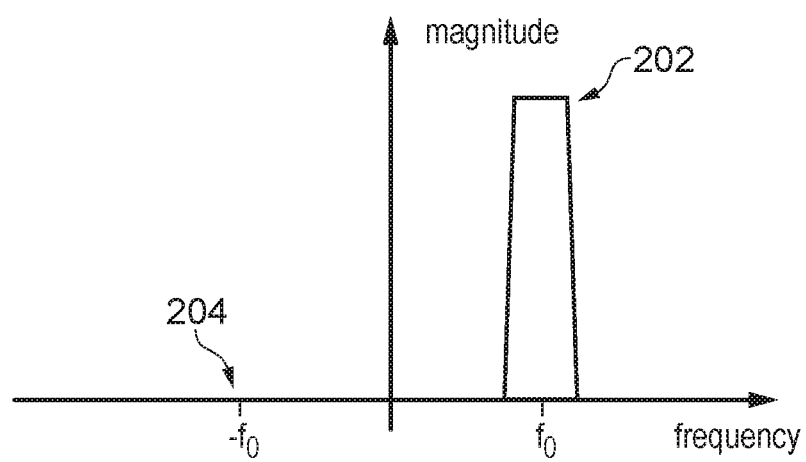
FIGS. 2a to 2d illustrate representations of frequency bands obtained by the front end described with reference to FIG. 1.

In an ideal case, the complex digital intermediate frequency signals provided by the front end 100 are such that frequency components do not have any correspondence with opposite, mirror frequency components. FIG. 2a illustrates an ideal complex IF signal that would be produced by a front end without any IQ amplitude or phase mismatches. Such an ideal front end provides a phase difference of exactly 90° ($\pi/2$) between the in-phase signal and the quadrature signal, and the amplitudes of the in-phase and quadrature signals are exactly the same. The ideal output signal of the front end provides a channel 202 at a positive frequency $f_0$, and no image 204 of the channel is found at a negative frequency $-f_0$.

However, there are in practice limitations on the matching capability of the analogue components of the front end 100. These limitations in the in-phase and quadrature paths 102, 104 may be introduced, for example, by component tolerances. Such mismatches between the in-phase and quadrature paths 102, 104 result in-phase and amplitude mismatches between the in-phase and quadrature paths 102, 104.

Figure 2B:
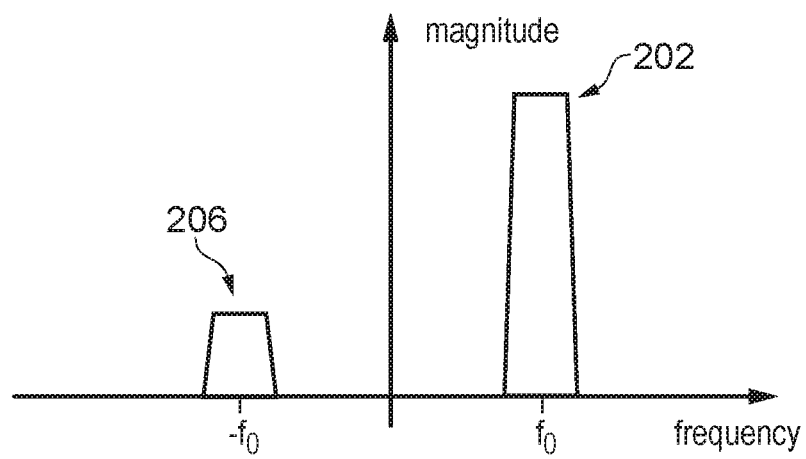
Figure 2C:
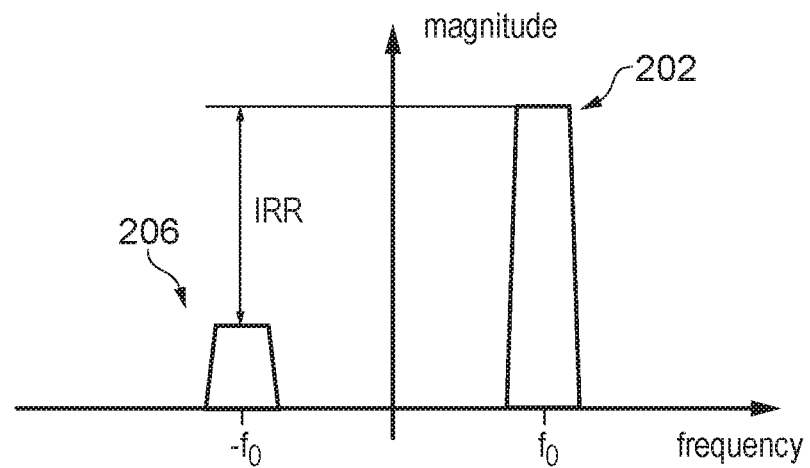

FIGS. 2b and 2c illustrate a non-ideal complex IF signal in which the channel signal 202 is provided at the positive frequency $f_0$, and an image 206 of the channel is found at a negative frequency $-f_0$. In FIG. 2c, an image rejection ratio IRR illustrates the difference between the magnitude of the channel signal 202 and the magnitude of the image 206.

Figure 2D:
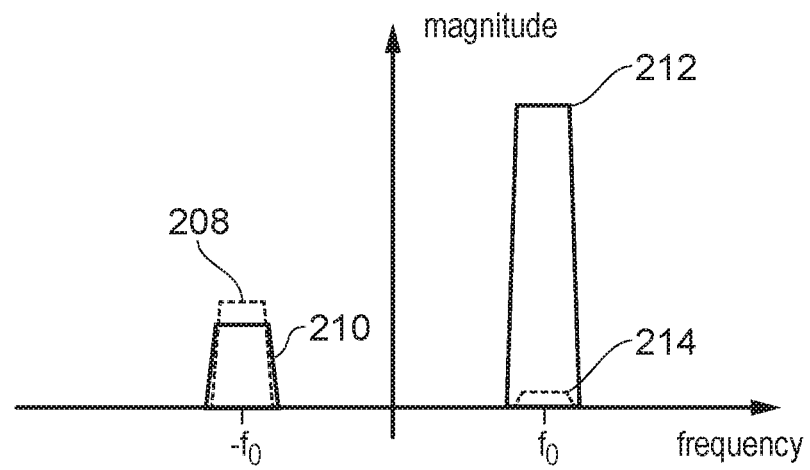

As illustrated in FIG. 2d, a result of the IQ mismatch is that if there is a small (wanted) signal 208 to be received at, for example, the negative frequency $-f_0$, a strong (blocker) signal 212 that happens to be at the positive frequency $+f_0$ disturbs or even disables reception of the wanted signal 208. The image 210 of the blocker is of a similar magnitude to the small (wanted) signal 208, and so prevents reception at the negative frequency. An image 214 is also present at the positive frequency $+f_0$ due to IQ amplitude and phase mismatches.

In order to address such difficulties, IQ mismatch detection and correction may be employed in the front-end of a radio receiver. An implementation of a radio receiver 300 employing a 'one-tap' (single filter notch) IQ correction approach is discussed below with reference to FIGS. 3a and 3b.

The receiver 300 has an analogue front end 301 and a digital correction section, which may also be referred to as a compensation system 325. The analogue front end 301 has an in-phase path (I path) 302 and a quadrature path (Q path) 304 that are similar to those described previously with reference to FIG. 1. Corresponding series of reference numerals are generally used to describe similar components between the various figures.

In the analogue front end 301, a RF input signal 308 is mixed with intermediate frequency carriers using mixers 306, 316 to generate in-phase (I) and quadrature (Q) components. The I and Q components are filtered by filters 310, 318, then amplified by amplifiers 312, 320 and converted to digital signals by analogue-to-digital converters 314, 322. The output of the analogue-to-digital converters 314, 322 may contain more than one channel of interest. The channels are often located at different frequencies in the signal band that is converted by the converters. Each channel may therefore be considered to be a sub-band of the RF input signal. Further digital processing subsequent to the front end 301 takes care of selecting the wanted channel and suppressing the unwanted channels.

Figure 3A:
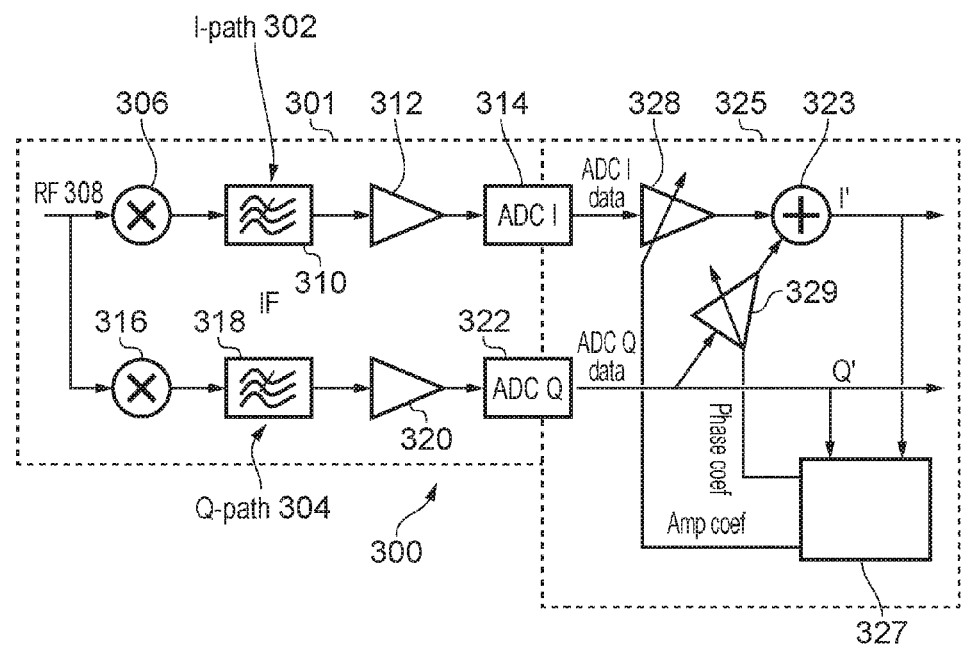
FIGS. 3a and 3b illustrate schematic block diagrams of a front end of a radio receiver that implements a 'one-tap' IQ mismatch correction approach.

The compensation system 325 shown in FIG. 3a provides a variable gain in the I path 302 to provide relative gain adjustment, as well as an addition of a variable part of the Q path 304 to the I path 302 to provide phase adjustment.

The output of the analogue-to-digital converter, including any phase mismatch, can be written as a sampled version of the signal:

$$ADC_{out}=A*\cos(wt+\varphi)+j*A*\sin(wt)$$

Where A equals the modulated blocker signal, w is the mixer frequency, t is the time and $\varphi$ is the phase mismatch. The blocker signal is the signal located at the negative frequency space of the desired frequency space. It causes signal content at the desired band when IQ mismatch is present. The equation can be rewritten as:

$$ADC_{out}=A*(\cos(wt)*\cos(\varphi)+\sin(wt)*\sin(\varphi))+j*A*\sin(wt)$$

Cos($\varphi$) and sin($\varphi$) are assumed to be constant or very slowly changing, since they represent the phase mismatch of the receiver. The term cos(wt)*cos($\varphi$) equals almost cos(wt), since $\varphi$ is assumed to be small. In any case, a deviation from cos($\varphi$)=31 will be compensated for by the amplitude correction.

The term sin(wt)*sin($\varphi$) is the error and it can be corrected by subtracting a scaled part the Q path (A*sin(wt)) with coefficient value sin($\varphi$).

Thus, the amplitude is corrected by the coefficient Amp coef which controls a variable amplifier 328, and the phase is corrected the the coefficient Phase coef which controls the variable amplifier 329. An adder 323 adds (or subtracts if the amplification is negative) the amplified Q channel into the I channel. The coefficients are derived by a coefficient estimator 327. The resulting generated signals I' and Q' have an improved IR performance when the coefficients are set to the correct values. These signals are used by the coefficient estimator, so that a feedback control loop is implemented.

Figure 3B:
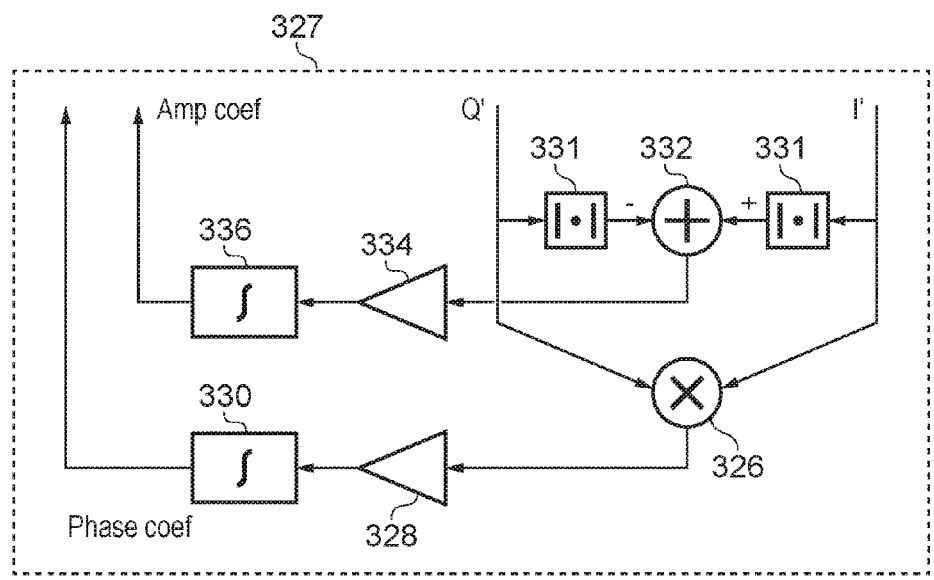

FIG. 3b shows a possible implementation of the coefficient estimator 327.

The phase coefficient is determined by integrating the correlation between the I' and Q' samples (multiplier 326 for performing the correlation, amplifier 328, integrator 330).

The amplitude difference is determined by integrating the difference between the absolute sample values of I' and Q' (magnitude units 331, adder 332, amplifier 334, integrator 336).

The outputs of the phase coefficient and amplitude difference are approximated by the following formulas. For these calculations, symmetrical phase and amplitude errors are applied in the formulas, to simplify the equations.

Let the intermediate frequency analogue-to-digital converter output be:

$$IF_{ADC}=(1+\Delta/2)*A*\cos(wt+\varphi/2)+j*(1-\Delta/2)*A*\sin(wt-\varphi/2) \qquad \text{Eq. 1}$$

Were $\Delta$ equals the amplitude difference between the I and Q branch, $\varphi$ the phase difference. A is the modulated blocker signal, w is the modulation frequency.

The blocker signal is located at frequency w, and there is an unwanted image at frequency $-w$.

For the coefficient estimator of FIG. 3b, the coefficients are obtained by subtracting the absolute values of the I and Q branch for the amplitude estimation, and multiplication of the I and Q branch to obtain the phase information. The integrators 330, 336 suppress any high frequency content.

For the amplitude estimation the subtraction of the absolute value (D) equals:

$$D=|(1+\Delta/2)*A*\cos(wt+\varphi/2)|-|(1-\Delta/2)*A*\sin(wt-\varphi/2)|$$

The average value of the absolute value of a sin or cosine function equals $2/\pi$. The average value Davg for the amplitude estimation can be rewritten as:

$$Davg=|A|*\Delta*2/\pi$$

This is a measure for the amplitude mismatch which is used to determine the value of Amp coef.

For the phase estimation the multiplication of I and Q lead to signal P:

$$P=(1+\Delta/2)*A*\cos(wt+\varphi/2)*(1-\Delta/2)*A*\sin(wt-\varphi2)$$

This can be rewritten as:

$$P=A^2*(1+\Delta/2)(1-\Delta/2)*(-\cos(\varphi/2)*\sin(\varphi/2)+\tfrac{1}{2}*\sin(2wt))$$

The compensation method usually compensates small amplitude and phase deviation. As such assumption cos($\varphi$/2)$\approx$1 and sin($\varphi$/2)$\approx\varphi$/2 can be made to simplify the results. To calculate the average phase detector value (Pavg), sin(2wt) is approximated to be 0. Pavg can be estimated by:

$$Pavg\approx-\tfrac{1}{2}*A^2*\varphi*(1-\tfrac{1}{4}*\Delta2)$$

This is a measure for the phase mismatch which is used to determine the value of Phase coef. The gain of Pavg weakly depends on the amplitude mismatch $\Delta$, but this mismatch Δ is assumed to be much smaller than 1, and thus will not have a large influence on the strength of the phase indicator.

Figure 4A:
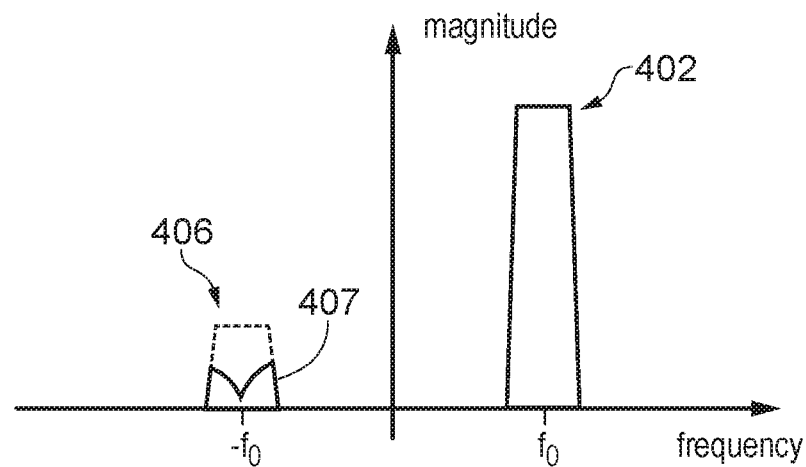
FIGS. 4a and 4b illustrate representations of frequency bands obtained by the front end described with reference to FIGS. 3a and 3b.
Figure 4B:
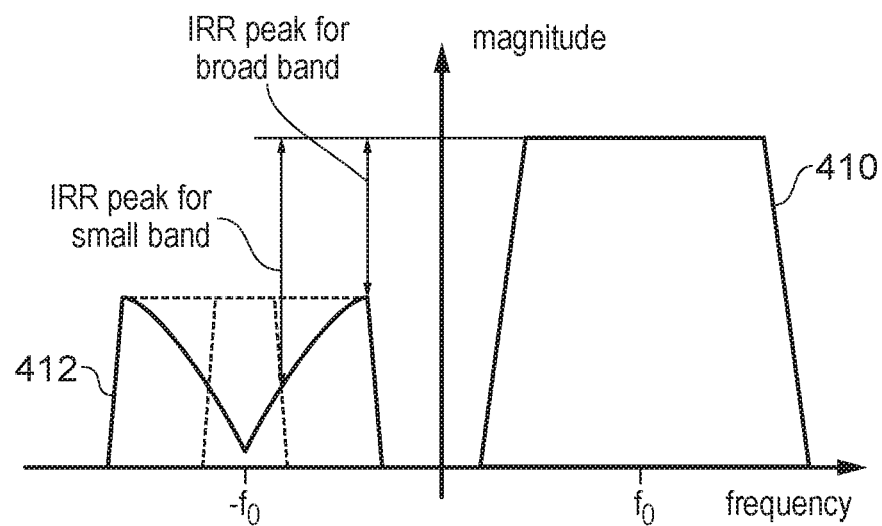

FIGS. 4a and 4b illustrate representations of frequency bands obtained by the front end described with reference to FIGS. 3a and 3b. The form of the representations in FIGS. 4a and 4b is similar to that described previously with reference to FIG. 2 in that signal magnitude is plotted on the vertical axis, against frequency on the horizontal axis.

FIG. 4a illustrates an example in which a relatively narrow bandwidth channel 402 is present at a positive frequency $f_0$. An image 406 of the channel 402 is present in the output of the analogue front end 301, as described previously with reference to FIG. 2b. However, by applying the coefficient estimator described with reference to FIG. 3, the image signal may be attenuated to provide an attenuated image 407. As can be seen in FIG. 4a, the attenuated image 407 is most reduced in the centre of the bandwidth of the image 406. As long as the coefficients are the same as a function of signal frequency, the IR performance is equal for the whole signal band. The attenuation of the image obtained by the front end of FIG. 3 may therefore be satisfactory for many applications when applied to a narrow bandwidth signal. However, when the optimum amplitude and phase coefficients vary as a function of frequency, the image rejection (IR) performance of the system described with reference to FIG. 3 is optimized for one frequency, and is therefore sub-optimal for the rest of the signal band. The receiver may be implemented such that coefficients are optimized for one frequency, while another frequency is of interest. This is a problem for a wide-band system in which multiple frequency sub-bands provide signal content.

FIG. 4b illustrates an example in which a broad bandwidth channel 410 is present at a positive frequency $f_0$. An image 412 of the channel 410 is present at a corresponding negative frequency $-f_0$. In comparison to the example in FIG. 4a, the IRR peak (peak magnitude of the image 412 relative to the magnitude of the channel 410) for the broad bandwidth signal is relatively large towards the extremities of the frequency band. Difficulties related to resolving channel interference using the system described with reference to FIG. 3 may therefore be encountered in a number of applications despite the good IRR provided at the centre of the frequency band.

Figure 5:
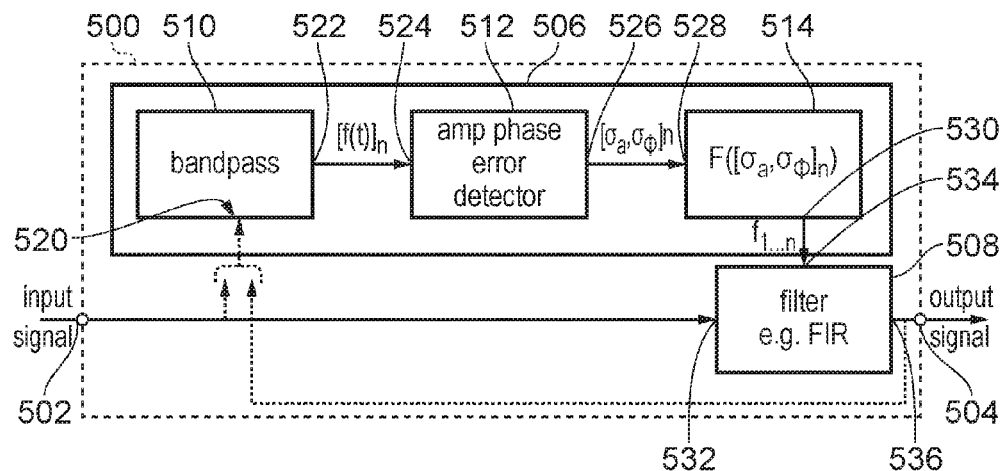
FIG. 5 illustrates a schematic block diagram of a first example of an IQ mismatch correction module for a broad bandwidth radio frequency receiver.

FIG. 5 shows a schematic block diagram of a first example IQ mismatch correction module 500 for providing improved reception of broad bandwidth signals in a radio receiver. That is, for signals with a bandwidth greater than 10 MHz or 25 MHz, for example.

The IQ mismatch correction module 500 comprises an input terminal 502 and an output terminal 504. The input terminal 502 is configured to receive an input signal, which may be an intermediate frequency signal. The input signal is a time domain signal with a bandwidth. The input signal may be provided by a digital domain intermediate frequency signal such as that generated by the front end described previously with reference to FIG. 1. The output terminal 504 is configured to provide a corrected output signal from the correction filter. The mismatch correction module 500 comprises a mismatch detection module 506 and a filter module 508 provided between the input and output terminals 502, 504.

The mismatch detection module 506 comprises a bandpass filter unit 510, an amplitude and phase detection unit 512 and a transformation unit 514.

The bandpass filter unit 510 has a bandpass filter input 520 and a bandpass filter output 522. The bandpass filter unit 510 is configured to receive a bandpass input signal at the bandpass filter input 520. The bandpass filter unit 510 is configured to select a plurality of n sub-bands by, for each sub-band within the bandwidth, passing the sub-band and blocking, or at least attenuating, other frequencies within the bandwidth that are outside of the sub-band. The bandpass filter unit 510 provides bandpass filtered signals for each of the n sub-bands at a bandpass filter output 522.

The bandpass input signal may be either the input signal from the input terminal 502 or the filtered output signal from the output terminal 504 of the IQ mismatch correction module 500. In this way, the IQ mismatch correction may be based on a feedforward or feedback signal. Typically, the input signal may be used as a feedforward signal. In the case that the bandpass filter signal is the input signal, the mismatch detection module 506 and the filter module 508 provide separate, parallel signal paths for the input signal within the IQ mismatch correction module 500.

The amplitude and phase detection unit 512 has an amplitude and phase detection input 524 and an amplitude and phase detection output 526. The amplitude and phase detection input 524 is coupled to the bandpass filter output 522. The amplitude and phase detection unit 512 is configured to determine amplitude and phase mismatch coefficients $[\sigma_a, \sigma_\phi]_n$ based on the bandpass filtered signals received from the bandpass filter output 522 for the plurality of n sub-bands. The amplitude and phase mismatch coefficients $[\sigma_a, \sigma_\phi]_n$ are provided at the amplitude and phase detection output 526.

The transformation unit 514 has a transformation input 528 and a transformation output 530. The transformation input 528 is coupled to the amplitude and phase detection output 526. The transformation unit 514 is configured to apply a transformation $F([\sigma_a, \sigma_\phi]_n)$ to the amplitude and phase mismatch coefficients $[\sigma_a, \sigma_\phi]_n$ to provide filter coefficients for the plurality of n sub-bands at the transformation output 530. The transformation $F([\sigma_a, \sigma_\phi]_n)$ comprise one or more mathematical transformations such as matrix transformations, which could also be an inverse Fourier transformation. In this way, the transformation unit 514 of the mismatch detection module 506 is configured to generate a set of filter coefficients $f_{1 \ldots n}$ for the plurality of sub-bands, and to provide the generated coefficients $f_{1 \ldots n}$ to the filter module 508 ($f_{1 \ldots n}$ for n/2 bandpass filters, which corresponds to n/2 sub-bands on the positive frequency side and n/2 sub-bands on the negative frequency side).

The filter module 508 has a signal input 532, a coefficient input 534 and a signal output 536. The signal input 532 of the filter module 508 is coupled to the input terminal 502 of the IQ mismatch correction module 500. The filter module 508 is configured to filter the input signal from the input terminal 502 in accordance with the filter coefficients $[f_{1 \ldots m}]_n$ received at the coefficient input 534 and to provide the filtered output signal at the signal output 536. The signal output 536 is coupled to the output terminal 504 of the IQ mismatch correction module 500. The filter 508 may make relatively small amplitude and phase corrections of the order of 1%, and so provides an almost all-pass filter. A finite impulse response (FIR) filter may be used to correct frequencies of the input signal in accordance with values of filter coefficients associated with those frequencies in order to provide the output filtered signal. In this way, the filter module may simultaneously apply the input signal filter coefficients that relate to all of the sub-bands to a single input signal. A method of constructing an FIR filter for use in the filter module is described in further detail below with reference to FIG. 24.

The mismatch detection module 506 may have a sequential processing architecture or a parallel processing architecture. A plurality of sub-bands may be obtained by sequentially operating one bandpass filter at different sub-bands or by operating a plurality of bandpass filters in parallel at different sub-bands.

In embodiments with a parallel processing architecture, the bandpass filter unit 510 comprises a plurality of bandpass filters. Each of the plurality of bandpass filters is configured to pass a different respective sub-band of the plurality of n sub-bands in order to provide the bandpass filtered signals from the plurality of sub-bands. The amplitude and phase detection unit 512 in such examples can comprise a plurality of amplitude and phase mismatch detectors that are configured to receive, in parallel, the respective bandpass filtered signals. Each of the amplitude and phase mismatch detectors is configured to determine amplitude and phase mismatch coefficients based on the bandpass filtered signals from a different respective sub-band of the plurality of sub-bands. The cut-off frequencies of the passbands and centre frequencies of the parallel bandpass filters may be fixed, or programmable. Each of the plurality of bandpass filters (n/2 'double sided', real bandpass filters applied to the complex signal: for n output sub-bands with positive and negative frequencies) may be associated with, and provide a bandpass filtered signal to, one of the plurality of amplitude and phase mismatch detectors.

In embodiments with a sequential processing architecture, the bandpass filter unit 510 may comprise only a single bandpass filter. The single bandpass filter is configured to provide the bandpass filtered signals from the plurality of sub-bands by sequentially passing different respective sub-bands of the plurality of sub-bands. The sequential operation is not necessarily performed according to a predefined sequence. In the purely sequential case, only one sub-band is analysed by the amplitude and phase detection unit 512 at any one time and so only a single amplitude and phase mismatch detector is required, as described further below with reference to FIG. 16. The computational complexity associated with, or hardware footprint (e.g. chip area) and power consumption of the bandpass filter unit 510 and the amplitude and phase detection unit 512 are therefore substantially reduced for the sequential processing architecture compared to the parallel processing architecture. Any amount of bandpass filters and amplitude/phase detectors between 1 and number of bands is possible, this depends on the balance power/area and convergence speed required.

The amplitude and phase mismatch detector 512 in the example of FIG. 5 may be implemented, for example, by providing one or more (depending on whether the architecture processes in sequence or parallel) coefficient estimators described with reference to FIG. 3b. In such examples, integrators collect amplitude and phase mismatch errors 512 to collect error information and the filter module 508 provides a compensated signal from which the error is deducted (so the filter passes 1—error). In the system of FIG. 5, the IQ mismatch correction module 500 uses the amplitude and phase mismatch estimates to generate filter coefficients. These coefficients are then implemented by the filter module in a parallel signal path for each of a plurality of sub-bands. As such, the IQ mismatch correction module 500 can apply compensation simultaneously in a number of sub-bands, rather than only providing a single filter notch as in the example of FIG. 3a. In addition, signal propagation from the input terminal 502 to the output terminal 504 via the filter module 508 is independent of the signal path from the input terminal 502 or output terminal 504 through the mismatch detection module 506, so the signal transmitted through the filter module 508 is not subject to perturbations introduced by the IQ mismatch correction module 500.

Figure 6:
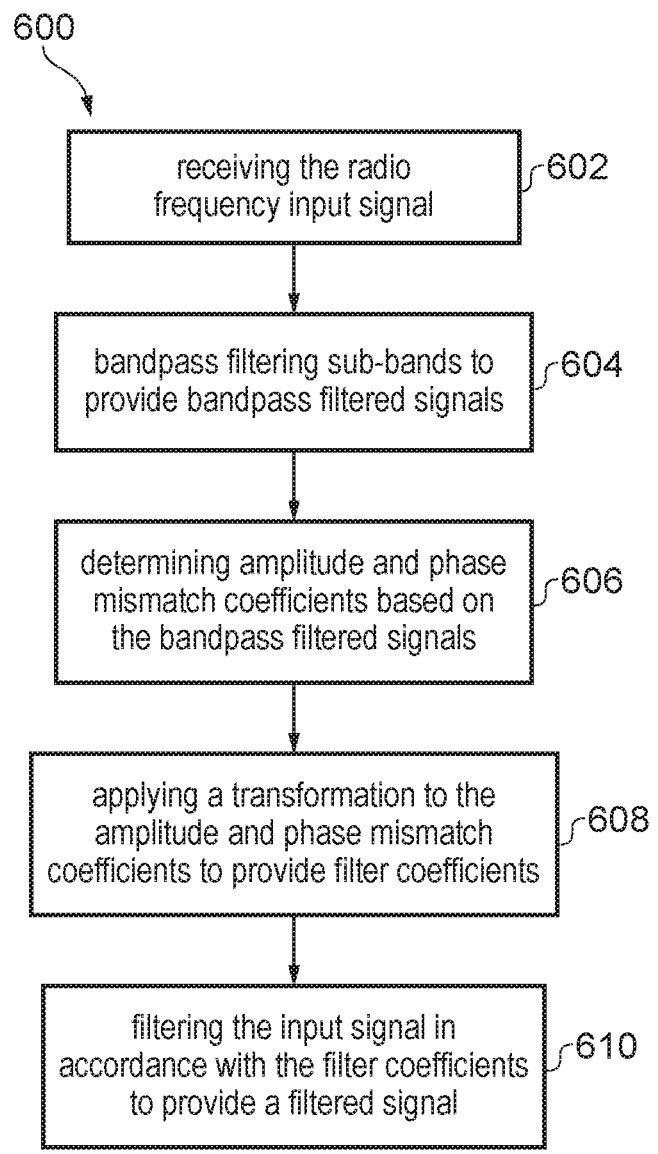
FIG. 6 illustrates a method of correcting an IQ mismatch in a radio frequency input signal.

FIG. 6 illustrates a method 600 of correcting an IQ mismatch in an input signal, which may be performed by the module of FIG. 5. The method 600 comprises:
  receiving 602 the input signal;
  bandpass filtering 604 sub-bands of the input signal or a filtered output signal to provide bandpass filtered signals from a plurality of sub-bands;
  determining 606 amplitude and phase mismatch coefficients based on the bandpass filtered signals from the plurality of sub-bands;
  applying 608 a transformation to the amplitude and phase mismatch coefficients to provide filter coefficients for the plurality of sub-bands;
  filtering 610 the input signal in accordance with the filter coefficients for the plurality of sub-bands to provide a filtered signal.

Figure 7:
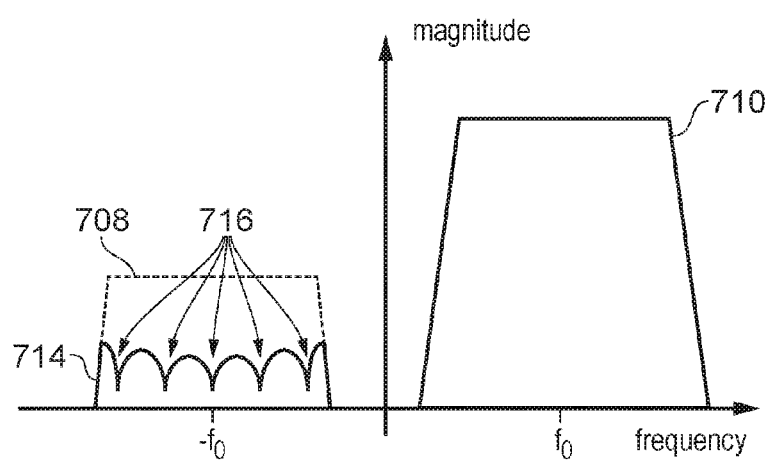
FIG. 7 illustrates representations of frequency bands obtained using the module described with reference to FIG. 5 or method described with reference to FIG. 6.

FIG. 7 illustrates representations of frequency bands obtained using the module described with reference to FIG. 5 or the method described with reference to FIG. 6. A broad bandwidth channel 710 is present at a positive frequency $f_0$. An image 714 of the channel 710 is present at a corresponding negative frequency $-f_0$. The image of the channel that would be present without compensation is shown as a ghost image 708. In comparison to the example in FIG. 4b, in which the image was attenuated at only a single point, the compensated image 714 is attenuated with nodes at a plurality of points spaced within the broad bandwidth signal. One node of attenuation is provided for each sub-band of the broad bandwidth signal. In this way, the magnitude of the image signal is attenuated across the full bandwidth and not only in the centre of the bandwidth. In comparison to the example in FIG. 4b, the magnitude of the compensated image 714 obtained using the method described with reference to FIG. 6 is relatively small towards the extremities of the bandwidth of the signal. The interference of the image signal 714 on a desired signal in the same frequency may therefore be reduced compared to the example described previously with reference to FIG. 4b.

Optional desirable features for implementing the IQ mismatch detection module of FIG. 5 or the method of FIG. 6, such as the provision of level estimators, automatic gain control, filter coefficient interpolation from IQ errors, correction coefficient smooth update interpolation, filtering optimization and architectural arrangements of implementations are discussed with regard to the remaining figures below.

The amplitude and phase mismatch detection module may be configured to cyclically generate the amplitude and phase mismatch coefficients by:
  integrating mismatches as a function of time, as described with reference to FIGS. 3b and 11a, to provide settled amplitude and phase mismatch coefficients; and
  starting a new cycle following the determination of the settled amplitude and phase mismatch coefficients. The filter module may be configured to be updated periodically based on filter coefficients which are based on the settled mismatch coefficient values. By using settled values, the IQ correction module avoids imparting noise on the filtered signal, as discussed below with reference to FIGS. 13a, 13b and 14.

The amplitude and phase mismatch detection module may be further configured to amplify differences prior to integration, as described with reference to FIGS. 3b and 11a.

The amplitude and phase mismatch detection module may be configured to decrease a gain of the amplification following initiation of a cycle, as described with reference to FIG. 14. In this way, the settling time of the integration process on an acceptable value may be improved while providing mismatch coefficients with relatively low noise.

The amplitude and phase mismatch detection module may be further configured to start a new cycle in response to determination of the settled amplitude and phase mismatch coefficients. In this way, the interval of each cycle can be minimized and so the responsiveness of the system can be improved, as described below with reference to FIGS. 17 and 18.

The amplitude and phase mismatch detection module may be configured to use amplitude and phase mismatch coefficients obtained during a previous cycle when determining the amplitude and phase mismatch coefficients for the plurality of sub-bands in a current cycle. In this way, the time taken to generate settled mismatch coefficients may be reduced and so the system responsiveness may be improved.

The mismatch detection module may be configured to calculate a series of filter coefficients based on the settled mismatch coefficient values from one cycle and the settled mismatch coefficient values from a subsequent cycle in order to avoid sudden substantial changes in the filter coefficients and so avoid distortions in the filter signal. This is described further below with reference to FIGS. 19 and 20.

The mismatch detection module may comprise an interpolation/extrapolation unit as discussed below with reference to FIGS. 9, 22 and 23. The interpolation/extrapolation unit may be configured to receive the amplitude and phase mismatch coefficients and to determine further amplitude and phase mismatch coefficients by interpolating and/or extrapolating values based on the received amplitude and phase mismatch coefficients. In this way, the noise level in the filter coefficients may be reduced.

The mismatch detection module may comprise level detection circuitry as discussed below with reference to FIGS. 15a, 15b. The level detection circuitry may be configured to identify positive or negative frequencies associated with sub-bands that contain useful information. The mismatch detection module may generate filter coefficients based on the identified positive or negative frequencies as discussed with reference to FIGS. 11a and 12. In this way, the noise level in the filter coefficients may also be reduced.

Figure 8:
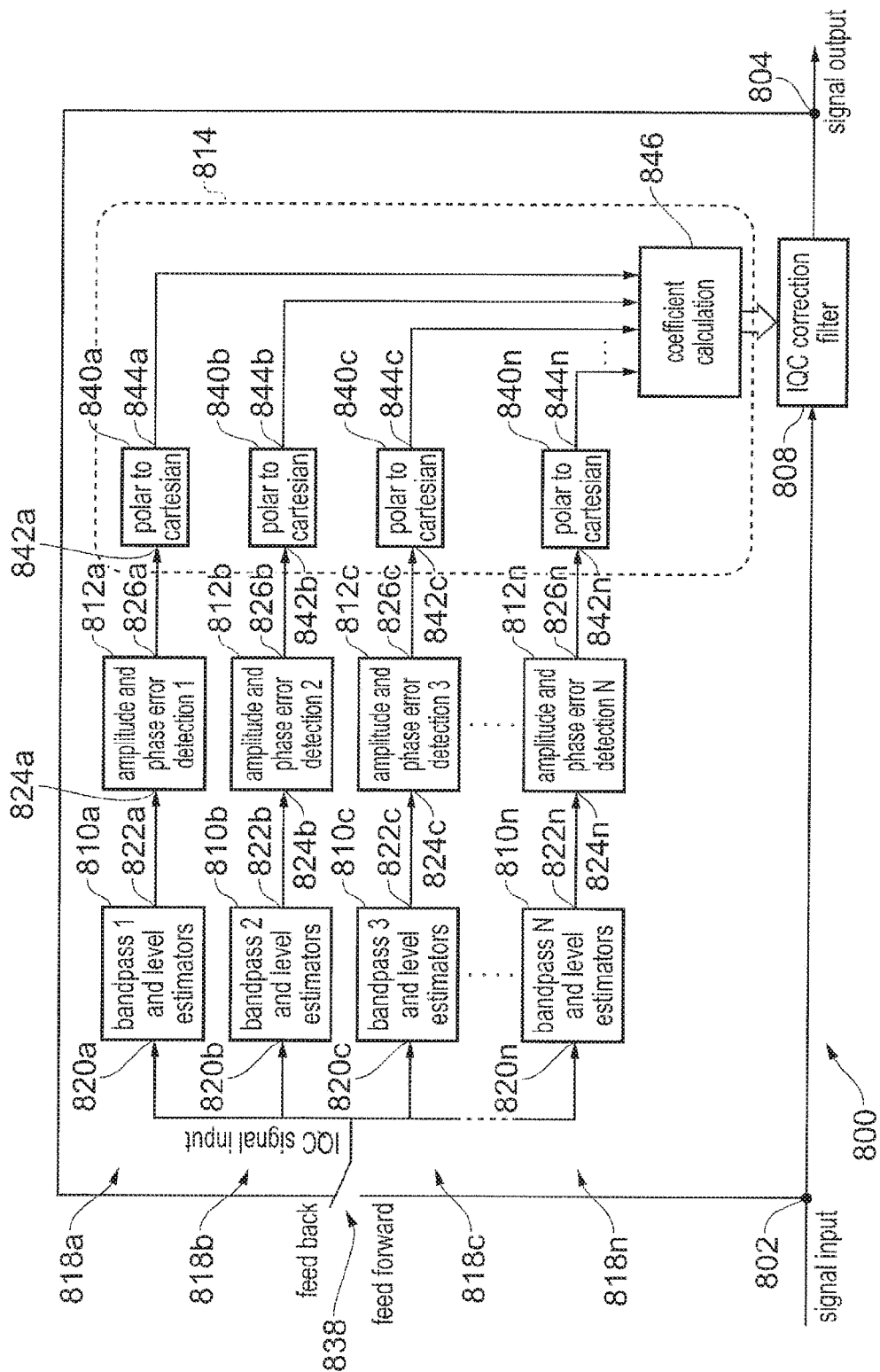
FIG. 8 illustrates a schematic block diagram of a second example IQ mismatch correction module for a broad bandwidth radio frequency receiver.
Figure 9:
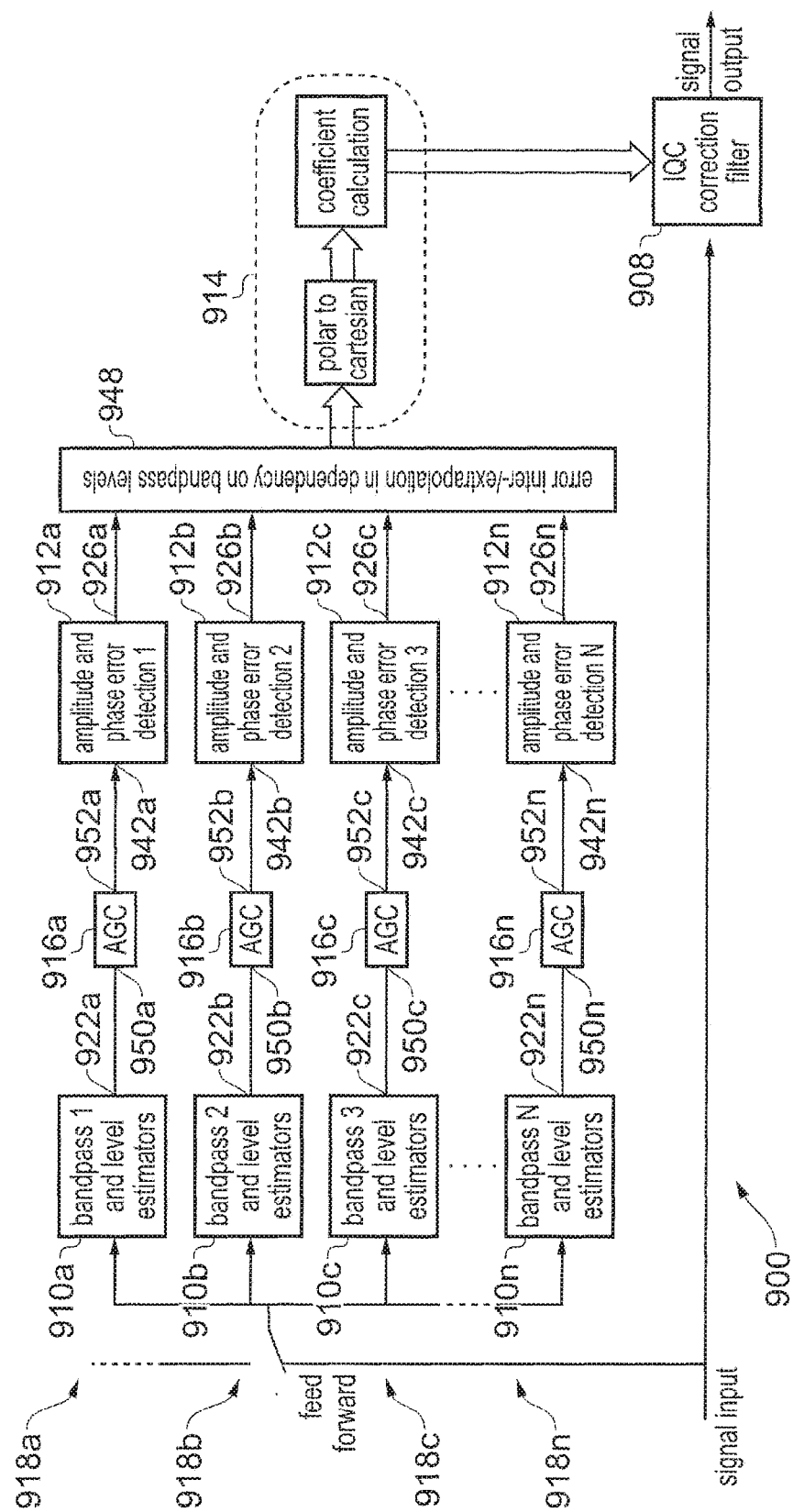
FIG. 9 illustrates a schematic block diagram of a third example IQ mismatch correction module for a broad bandwidth radio frequency receiver.

FIGS. 8 and 9 illustrate second and third example IQ mismatch correction modules 800, 900 with parallel processing architecture for processing a plurality of n sub-bands of a broad bandwidth signal. Bandpass filtering and amplitude and phase mismatch detection is performed separately for each sub-band in the parallel processing architecture by respective signal paths 818a-n, 918a-n. Each signal path illustrated in FIGS. 8 and 9 relates to separate I and Q parts of a signal.

Both the second and third example IQ mismatch correction modules 800, 900 each comprise a filter module 808, 908 that is similar to that described previously with reference to FIG. 5.

The bandpass filters 810a-n, 910a-n of the IQ mismatch correction modules 800, 900 in these examples comprise level estimators. Level estimation provides an indication of whether a positive or negative frequency in the sub-band includes useful signal information. The calculation of level estimates is discussed further with reference to the example level selectors of FIGS. 15a and 15b.

In the second example IQ mismatch correction modules 800, each signal path 818a-n provides a bandpass filter 810a-n and an amplitude and phase error detector 812a-n. The functionality of the bandpass filters 810a-n and amplitude and phase mismatch detectors 812a-n is similar to that described previously with reference to FIG. 5.

Each bandpass filter 810a-n has a bandpass filter input 820a-n and a bandpass filter output 822a-n. The bandpass filters 810 are each coupled to a switch 838 that connects the bandpass filter inputs 820a-n to either the input terminal 802 or the output terminal 804 of the IQ mismatch correction module 800.

Each amplitude and phase mismatch detector 812a-n has an amplitude and phase detection input 824a-n and an amplitude and phase detection output 826a-n. The amplitude and phase detection input 824 of a particular amplitude and phase mismatch detector 812a-n is coupled to the bandpass filter output 822a-n of a bandpass filter 810a-n that is associated with the same signal path 818a-n as that particular amplitude and phase mismatch detector 812a-n.

The transformation module comprises a polar-to-Cartesian transformation block 840a-n for each signal path 818a-n, and a filter coefficient calculator 846. Each polar-to-Cartesian transformation block 840a-n has a Cartesian transformation input 842a-n and a Cartesian transformation output 844a-n. The Cartesian transformation input 842a-n of a particular polar-to-Cartesian transformation block 840a-n is coupled to the amplitude and phase detection output 826a-n of an amplitude and phase mismatch detector 812a-n associated with the same signal path 818a-n as that particular polar-to-Cartesian transformation block 840a-n. The role of the polar-to-Cartesian transformation block 840a-n is to convert the phase and amplitude mismatch coefficients calculated by the phase and amplitude mismatch detectors 812a-n, which may be represented by polar coordinates, to real and imaginary frequency components that may be represented by Cartesian coordinates and are suitable for use as inputs to a matrix transform. The real and imaginary frequency components may therefore be considered as transformed amplitude and phase mismatch coefficients. The polar to Cartesian transformation may be performed periodically, rather than in real time, in order to reduce computational requirements in the system. The period computations are not necessarily over a regular or fixed period. The interval between calculation of the polar to Cartesian transformation affects the responsiveness of the system and so may be selected in accordance with expected signal mismatch evolution.

Each Cartesian transformation output 844a-n is provided as an input of the filter coefficient calculator 846. The filter coefficient calculator 846 may be implemented by a matrix transform, as discussed in further detail below with reference to FIG. 24. Alternatively, as a special case of a matrix transformation or in addition, the transformation may comprise an inverse fast Fourier transformation. The transformation of the filter coefficient calculator 846 acts on the transformed amplitude and phase mismatch coefficients and provides correction filter coefficients. The filter coefficient calculator 846 provides the filter coefficients at a transformation output 830.

In FIG. 9, the third example IQ mismatch correction module 900 is generally similar to that described previously with reference to FIG. 8 but further comprises a plurality of n automatic gain controllers 916a-n and an interpolation/extrapolation unit 948.

One automatic gain controller (AGC) 916a-n is provided for each of the plurality of n sub-bands in the respective signal paths 918a-n. The automatic gain controllers 916a-n each have an AGC input 950a-n and an AGC output 952a-n.

The AGC input 950a-n of a particular AGC 916a-n is coupled to a bandpass filter output 922 of a bandpass filter 910a-n that is associated with the same signal path 918a-n as that particular AGC 916a-n. The automatic gain controllers 916a-n each receive a bandpass filtered signal from a bandpass filter 910a-n associated with the same signal path 918a-n as that automatic gain controller 916a-n and perform gain control on the bandpass filtered signal. The AGC output 952a-n of a particular AGC 916a-n is coupled to the amplitude and phase mismatch detector input 942a-n of the amplitude and phase mismatch detector 912a-n that is associated with the same signal path 918a-n as that particular AGC 916a-n. The bandpass filtered signal is therefore provided by each AGC 916a-n to an amplitude and phase mismatch detector 912a-n associated with that respective automatic gain controller 916a-n. It has been found that use of AGCs results in a faster convergence time for low amplitude sub-band signals, as discussed further below with reference to FIGS. 13a, 13b and 14.

All of the amplitude and phase detection outputs 926a-n are connected to the interpolation/extrapolation unit 948 in order to provide the amplitude and phase mismatch coefficients to the interpolation/extrapolation unit 948. The interpolation/extrapolation unit 948 is configured to determine further amplitude and phase mismatch coefficients for sub-bands within the broad bandwidth by interpolating and/or extrapolating values based on the received amplitude and phase mismatch coefficients. Possible implementations of the interpolation/extrapolation unit 948 are discussed further below with reference to FIGS. 22 and 23.

The amplitude and phase mismatch coefficients, including any interpolated or extrapolated values, are provided by the interpolation/extrapolation unit 948 to the transformation module 914. The implementation of the transformation module 914 is similar to the example described previously with reference to FIG. 8. The arrows representing dataflow to, from and within the transformation module 914 in FIG. 9 represent the parallel flow of data the separate signal path associated with the respective sub-bands.

The automatic gain controllers 916a-n and the interpolation/extrapolation unit 948 may be provided independently of one another in other examples. For example, similar automatic gain controllers and/or interpolators may also be used in the first example described previously with reference to FIG. 5.

FIGS. 10a to 10f illustrate signals associated with an implementation of the IQ mismatch correction module described previously with respect to FIGS. 5, 8 and 9.

Figure 10A:
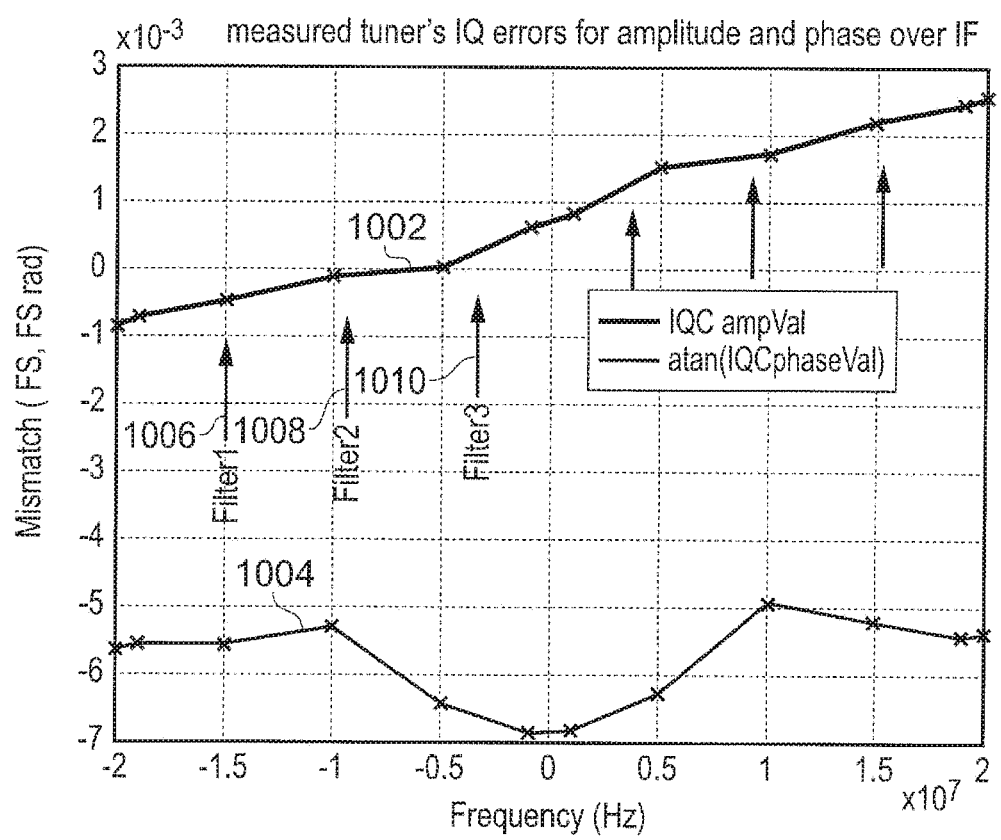

FIG. 10a illustrates example profiles prior to amplitude and phase mismatch correction of phase mismatch 1002 in rad and amplitude mismatch 1004 in fullscale ratio against frequency (in Hz) for an IQ mismatch in an intermediate frequency signal introduced by the analogue reception path. The phase mismatch here is roughly linear and has a zero crossing at about −5 MHz. The biggest amplitude mismatch occurs at about 0 Hz, and is smaller at both positive and negative frequencies. Arrows show mid frequency positions 1006, 1008, 1010 of first, second and third bandpass filters (filter1, filter2, filter3) operating on three of a plurality of sub-bands.

Figure 10B:
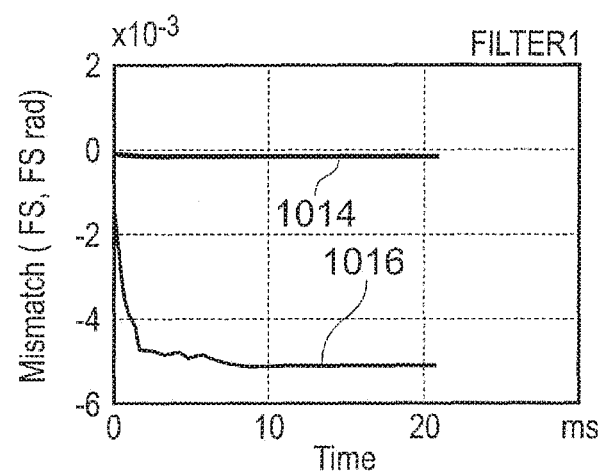

FIG. 10b illustrates the convergence of the phase and amplitude detector for the first filter (filter1) discussed above with reference to FIG. 10a. The detected amplitude error 1016 converges to the amplitude error at the mid frequency of the first filter (filter1), as depicted for curve 1004 in FIG. 10a. The detected phase error 1014 converges to the phase error at the mid frequency of the first filter (filter1), as depicted for curve 1002 in FIG. 10a.

Figure 10C:
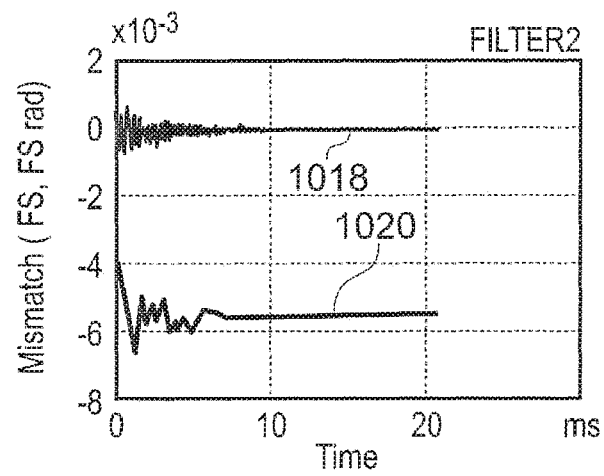

FIG. 10c illustrates the convergence of the phase- and amplitude detector for the second filter (filter2) discussed above with reference to FIG. 10a. The detected amplitude error 1020 converges to the amplitude error at the mid frequency of the second filter (filter2), as depicted for curve 1004 in FIG. 10a. The detected phase error 1018 converges to the phase error at the mid frequency of the second filter (filter2), as depicted for curve 1002 in FIG. 10a.

Figure 10D:
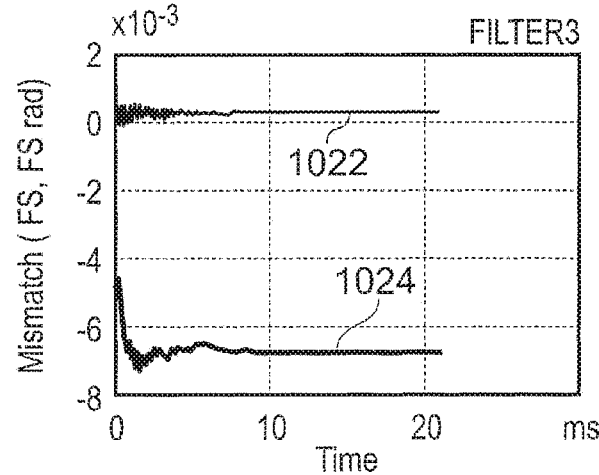

FIG. 10d illustrates the convergence of the phase- and amplitude detector for the third filter (filter3) discussed above with reference to FIG. 10a. The detected amplitude error 1024 converges to the amplitude error at the mid frequency of the third filter (filter3), as depicted for curve 1004 in FIG. 10a. The detected phase error 1022 converges to the phase error at the mid frequency of the third filter (filter3), as depicted for curve 1002 in FIG. 10a.

Figure 10E:
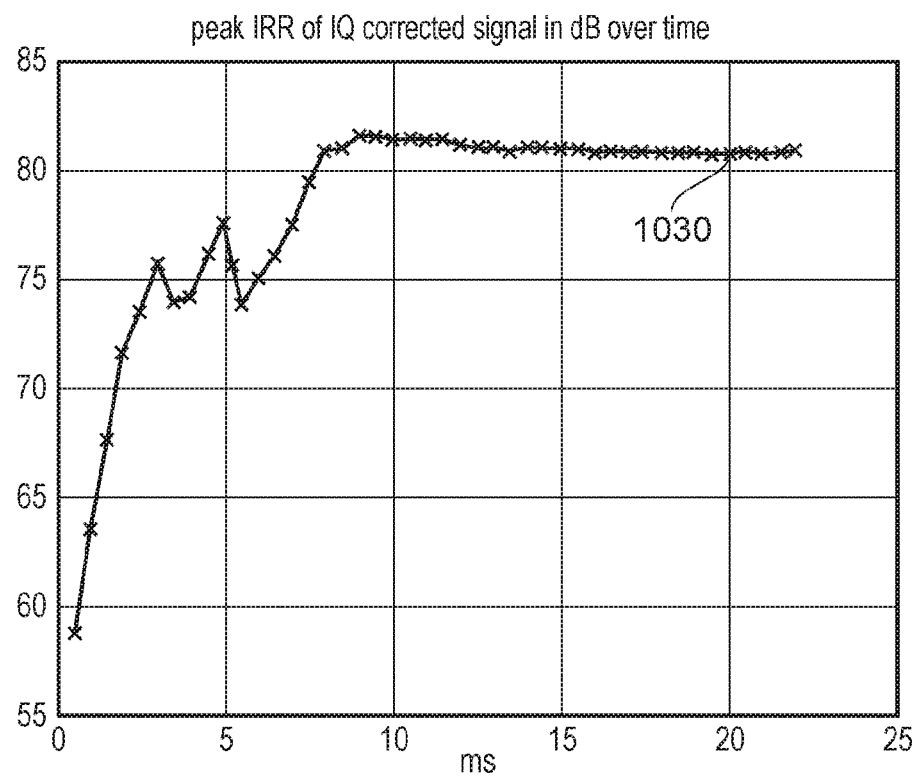

FIG. 10e illustrates the peak image rejection ratio (IRR) in dB against time (in ms) of filtered signals at the output of the IQ mismatch detector. The settling time of the system is about 10 ms. During this time, integrators within the amplitude and phase mismatch detectors are converging on a value.

Figure 10F:
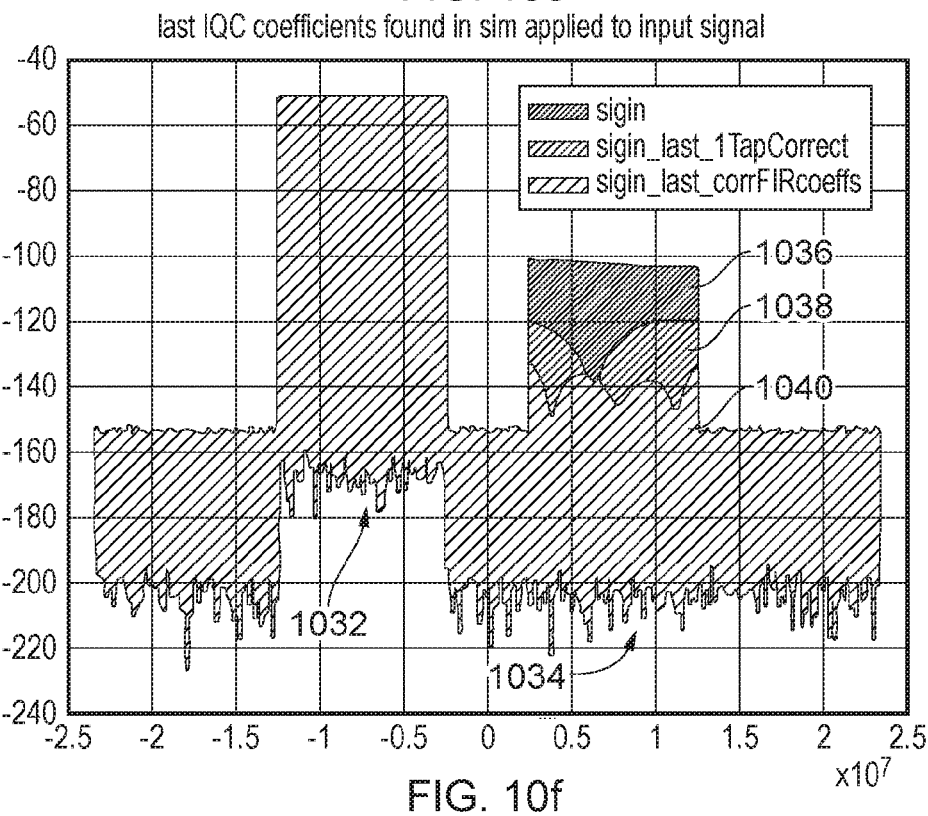

FIG. 10f illustrates the magnitude of various signals against frequency. The signals represent a broad bandwidth channel 1032, with a bandwidth of about 10 MHz centred at a negative frequency, and an image 1034 centred at a corresponding positive frequency. Three representations of the image 1034 are shown. An uncompensated image 1036 has a high magnitude throughout its bandwidth, as discussed above with reference to FIGS. 4b and 7. A 'single tap' compensated image 1038, such as that provided by the compensation system described with reference to FIGS. 3a and 3b, attenuates the image at a node adjacent to the centre of the frequency band, as discussed previously with reference to FIG. 4b. A 'multi-tap' compensated image 1040, such as that provided by the IQ mismatch correction module described with reference to FIG. 5, 8 or 9, attenuates the image at a plurality of nodes throughout the frequency band, as discussed previously with reference to FIG. 7.

FIG. 11a illustrates an example amplitude and phase mismatch detector 1112i for use in the IQ mismatch correction module described previously with reference to FIGS. 5, 8 and 9.

The amplitude and phase mismatch detector 1112i is based on the coefficient estimator described previously with respect to FIG. 3b. In this example, each phase coefficient is determined by integrating a correlation between in-phase and quadrature samples for both the positive and negative frequencies of the sub-band and the desired polarity of frequency is selected for use.

The amplitude and phase mismatch detector 1112i comprises an in-phase input 1174 and a quadrature input 1176. The quadrature and phase input signals are corrected by the current found correction values, in a similar way as for the single tap case like described in FIGS. 3a and 3b. One difference is that the correction signal is selected with multiplexers 1140, 1142. The amplitude and phase mismatch detector 1112i can choose to not compensate when no proper signal is present, as determined by signal level selection circuitry discussed below with reference to FIG. 15a, or to select the coefficient for the positive band when a 'proper blocker' is present in the positive band, or the coefficient for the negative band when a 'proper blocker' is present in the negative band.

The amplitude and phase mismatch detector 1112i comprises an in-phase variable gain amplifier 1180 and a quadrature variable gain amplifier 1182. The in-phase variable gain amplifier 1180 receives an in-phase input signal from the in-phase input 1174. The quadrature variable gain amplifier 1182 receives a quadrature input signal from the quadrature input 1176. A first adder 1184 adds signals from the in-phase variable gain amplifier 1180 and the quadrature variable gain amplifier 1182 to provide a compensated in-phase signal.

The first magnitude determining unit 1131a receives the quadrature input signal from the quadrature input 1176. A second magnitude determining unit 1131b receives the compensated in-phase signal from the first adder 1184. A second adder 1132 has an addition input connected to an output of the second magnitude determining unit 1131b and a subtraction input connected to an output of the first magnitude determining unit 1131a. The result of the addition performed by the second adder 1132 is provided to a positive band amplitude integrator 1136a and to a negative band amplitude integrator 1136b via respective amplifiers 1134a, 1134b.

A multiplier 1126 is configured to multiply the in-phase signal from the compensated in-phase signal from the first adder 1184 and the quadrature signal from the quadrature input 1176 to provide a multiplied signal. The multiplied signal is provided to a positive phase integrator 1136c and to a negative phase integrator 1136d via respective amplifiers 1134c, 1134d.

Each of the integrators 1136a-d has an enabling input. The positive phase integrator 1136c and the positive amplitude integrator 1136a have a common enabling input. The negative phase integrator 1136d and the negative amplitude integrator 1136b also have a common enabling input. In this way, the amplitude and phase mismatch detector 1112i may be enabled to provide amplitude and phase mismatch coefficients related to either a positive or negative frequency of the sub-band. Operation of the amplitude and phase mismatch detector 1112i is discussed below with reference to FIGS. 11b and 11c.

A first multiplexor 1140 has a first selectable input, a second selectable input, a third selectable input, a first multiplexor input, a second multiplex input and an output. The first selectable input of the first multiplexor 1140 is connected to the output of the positive amplitude integrator 1136a. The second selectable input of the first multiplexor 1140 is connected to the negative amplitude integrator 1136b. The third selectable input of the first multiplexor 1140 receives a null input. The first multiplexor input of the first multiplexor 1140 provides a common enabling input with the positive phase integrator 1136c and the positive amplitude integrator 1136a. The second multiplexor 1140 of the first multiplexor 1140 provides a common enabling input with the negative phase integrator 1136d and the negative amplitude integrator 1136b. The output of the first multiplexor 1140 and a unity input are added together by a third adder 1186 and the output of the third adder eliminated 6 controls the in-phase variable gain amplifier 1180.

A second multiplexor 1142 has a first selectable input, a second selectable input, a third selectable input, a first multiplexor input, a second multiplex input and an output. The first selectable input of the second multiplexor 1142 is connected to the output of the positive phase integrator 1136c. The second selectable input of the second multiplexor 1142 is connected to the negative phase integrator 1136d. The third selectable input of the second multiplexor 1142 receives a null input. The first multiplexor input of the second multiplexor 1142 provides a common enabling input with the positive phase integrator 1136c and the positive amplitude integrator 1136a. The second multiplexor 1140 of the second multiplexor 1142 provides a common enabling input with the negative phase integrator 1136d and the negative amplitude integrator 1136b. The output of the second multiplexor 1142 controls the quadrature phase variable gain amplifier 1182.

FIG. 11b illustrates an example zero-IF signal. The zero-IF signal contains four sub-bands containing sets of positive and negative frequencies at either a low magnitude 1154 or a high magnitude 1156. A first sub-band contains a first high magnitude signal 1158 at a first positive frequency $+f_1$ and a first low magnitude signal 1160 at a first negative frequency $-f_1$. A second sub-band contains a second high magnitude signal 1162 at a second negative frequency $-f_2$ and a second low magnitude signal 1164 at a second positive frequency $+f_2$. A third sub-band contains a third high magnitude signal 1166 at a third positive frequency $+f_3$ and a third low magnitude signal 1168 at a third negative frequency $-f_3$. A fourth sub-band contains a fourth high magnitude signal 1170 at a fourth negative frequency $-f_4$ and a fourth low magnitude signal 1172 at a fourth positive frequency $+f_4$.

FIG. 11c illustrates four signal paths 1118a-d of a mismatch detector module. Each signal path 1118a-d comprises a bandpass filter 1110a-d and an amplitude and phase mismatch detector 1112a-d such as that described previously with reference to FIG. 11a. Each bandpass filter 1110a-d is configured to select one of the sub-bands discussed previously with respect to FIG. 11b. Representations of the selected frequencies are also illustrated next to the bandpass filters 1110a-d in FIG. 11c. The dotted lines on the representations of the selected frequencies illustrate the shaping profiles of the bandpass filters 1110a-d. Circuitry for selecting whether to select the negative frequency of the positive frequency is described above with reference to FIG. 11a and further below with reference to FIG. 15.

FIG. 12 illustrates another example signal path 1218 for operating on a sub-band in a mismatch detection module. The signal path 1218 comprises a bandpass filter and level estimation unit 1210, an automatic gain controller (AGC) 1216 and an amplitude and phase mismatch detector 1212. The bandpass filter and level estimation unit 1210 has a bandpass input 1220 and the bandpass output 1222. The bandpass input 1220 is configured to receive a bandpass input signal as described previously with reference to FIG. 5, for example.

The AGC 1216 has an AGC input 1250 and an AGC output 1252. The AGC input 1250 is connected to the bandpass output 1222. The amplitude and phase mismatch detector 1212 has a first input 1290 connected to the bandpass output 1222 and a second input 1292 connected to the AGC output 1252. The amplitude and phase mismatch detector 1212 also has a disable input 1294. A controller 1296 comprising a five input OR gate disables the amplitude and phase mismatch detector 1212 in response to the following conditions:

a coarse step change in the signal at the AGC output 1252, which indicates distortion;

a coarse step change in a AGC signal in another path;

the signal at the bandpass output 1222 reaching or being below a low-level threshold, which may be too low to operate on;

similar levels being found in corresponding positive and negative frequency sub-bands, which indicates that the sub-band comprises multiple signals; and a clipped signal being detected anywhere in the reception path.

FIGS. 13a and 13b illustrate coefficient profiles of amplitude and phase mismatch coefficients obtained as a function of time after initiation of integrators in an amplitude and phase mismatch detection module, such as those described previously with reference to FIGS. 3b and 11a. The amplifiers in the amplitude and phase mismatch detection module provide a gain, which may also be referred to as loop gain. FIG. 13a shows an amplitude coefficient profile 1302 and a phase coefficient profile 1304 for a system with 'low' loop gain (of the order of $1 \times 10^{-4}$). FIG. 13b shows an amplitude coefficient profile 1306 and a phase coefficient profile 1308 for a system with 'high' loop gain (of the order of $1 \times 10^{-3}$).

The convergence speed of the IQ mismatch correction module may be determined by considering the period in which it takes the coefficients 1302, 1304, 1306, 1308 to settle on a stable value. The conversion speed for the IQ mismatch correction module with low loop gain is unacceptably slow for many applications because the amplitude coefficient profile 1302 and phase coefficient profile 1304 settle on a stable value after about 60 ms, resulting in poor responsiveness of the system as a whole. In contrast, the conversion speed for the IQ mismatch correction module with high loop gain is acceptable for most applications because the amplitude coefficient profile 1306 and phase coefficient profile 1308 settle on a stable value after about 0.1 ms. By comparison of FIGS. 13a and 13b, it can be seen that the average absolute value of the coefficients obtained is not affected by the loop gain. However, the noise in the obtained coefficients is increased by increasing the loop gain.

FIG. 14 illustrates an amplitude coefficient profile 1410 and a phase coefficient profile 1412 obtained as a function of time after initiation of integration in an IQ mismatch correction module with variable loopgain 1414. The loopgain 1414 is also plotted as a function of time with the amplitude and phase coefficient profiles 1410, 1412. The loop gain linearly decreases from a 'high' loop gain of about $1 \times 10^{-3}$ to a low' loop gain of about $1 \times 10^{-4}$ between 0 and 0.4 ms. By decreasing the loop gain as a function of time following the initiation of integration, the benefits of both low and high loop gain can be obtained. At the start of the period when the loop gain is high, the coefficient value rapidly converges, albeit with high noise. Later in the period when the loop gain is reduced, the coefficient values are already near or at a settled value and the reduction in loop gain reduces the noise in the coefficient value. The scheme therefore provides a balance between conversion speed and accuracy that are suitable for many applications.

The implementation of variable loop gain within the correction module in FIG. 3b still results in a 'noisy' signal for the first part of the convergence-time, which leads to contamination of the compensated output signal because the determined mismatch correction is applied directly to the input signal to provide the compensated output signal. However, in the first, second and third examples described with reference to FIGS. 5, 8 and 9, the compensating filter is decoupled from the mismatch detection module in that they act on parallel signal paths. The mismatch detection module may therefore work on the bandpass filter input signal without directly changing the radio-frequency input signal that is provided at the output. This leaves the signal chain clean and free from coefficient convergence noise. The filter module may therefore be configured to only apply filtering when suitably converged mismatch coefficient values are found (using a low loopgain, for example). At that point, the matrix transformation is executed and the compensation filter coefficients are updated. In this way, initially between start up and a first correction coefficient update, there may be no IQ correction applied to the IQC input signal. As such, the IQ-matching may be limited to 'analog IQ matching' until the filter gets a coefficient update. This would lead to an IRR of roughly 50 dB in the example discussed above with regard to FIG. 10f, but waiting for this 'offline' coefficient searching enables fast coefficient tracking without contaminating the main signal with noise, as shown with FIGS. 13, 14.

Another approach for reducing conversion time is, on initiation of integration within the amplitude and phase mismatch detector for a particular sub-band, to load mismatch coefficient values that were found in a previous active calibration state for that sub-band. By starting with the previously found values, rather than 0 or an arbitrary value, the settling time may be reduced because the previously found values are more likely to be roughly correct.

A controller may be provided in a mismatch detection module in order to decrease the loop gain in the mismatch detection module following initiation of determination of the amplitude and phase mismatch coefficients, and so reduce conversion time. In addition or alternatively, the controller may also be configured to use previously determined amplitude and phase mismatch coefficients, or related values, when determining the present amplitude and phase mismatch coefficients for the plurality of sub-bands.

FIG. 15a illustrates a level selection circuit 1500a for determining whether to select a positive or negative frequency of sub-band of an intermediate frequency signal. Level selection enables the mismatch detection unit to use only positive or negative frequency components of sub-bands that include useful signal information.

The level selection circuit 1500a comprises a main path 1501a and logic circuitry 1503a. The level selection circuit 1500a is configured to receive a negative frequency signal level 1506 and a positive frequency signal level 1510 which may be generated, for example, by averaging the rectified bandpass filtered signals for the respective positive and negative frequencies of the sub-band. A first order low pass filter may be used to average the rectified bandpass filtered signals.

The main path 1501a comprises a first comparison unit 1502 and a second comparison unit 1504. The first comparison unit 1502 compares a negative frequency signal level 1506 of a current sub-band with a minimum level 1508 and provides the comparison output (digital one or zero) 1509. The second comparison unit 1504 compares a positive frequency signal level 1510 and provides the comparison output (digital one or zero) 1512.

The main path 1501a also comprises a first divider 1514 and a second divider 1518. The first divider 1514 is configured to divide the negative frequency signal level 1506 by the positive frequency signal level 1510 to provide a negative to positive ratio 1516. The second divider 1518 is configured to divide the positive frequency signal level 1510 by the negative frequency signal level 1506 to provide a positive to negative ratio 1520.

The main path 1501a also comprises a third comparison unit 1522 and a fourth comparison unit 1528. The third comparison unit 1522 is configured to compare the negative to positive ratio 1516 with a minimum ratio 1524 and to provide the third comparison output (digital one or zero) 1526. The fourth comparison unit 1528 is configured to compare the positive to negative ratio 1520 with the minimum ratio 1524 and to provide the comparison output (digital one or zero) 1530.

The logic circuitry 1503*a* comprises first and second three-input AND gates 1532, 1534 and an OR gate 1536 that is configured to receive output signals from the first and second 3 input AND gates 1532, 1534 and to provide an indication of a valid signal.

The first three-input AND gate 1532 receives:
the third comparison output 1526;
the first comparison output 1509; and
a disable signal indicative of clipping occurring anywhere in the reception path. The output of the first 3 input AND gate 1532 provides an input to select the negative band in the detector described with reference to FIG. 11*a*.

The second three-input AND gate 1534 receives:
the fourth comparison output 1530;
the second comparison output 1512;
the disable signal indicative of clipping. The output of the second 3 input AND gate 1534 provides an input to select the positive band in the detector described with reference to FIG. 11*a*.

The level detectors supply the IQ error detectors with information on proper signal conditions in the different bands. If the level detection is slow, with large time constants, the detected level is quite stable, but because of the latency, information for fast changing signals constellations could be too old, could lead the IQ error detectors summing up IQ error information for the wrong band or detect inappropriate signals.

FIG. 15*b* illustrates a further level selection circuit 1500*b*. The level selection circuit 1500*b* comprises a second, slow path 1501*c* in addition to a first, fast path 1501*b*. The slow and fast detection paths 1501*b*, 1501*c* are similar to the main path 1501*a* described previously with reference to FIG. 15*a*, but receive negative and positive frequency signal levels that have been averaged over different time periods. The fast negative and positive frequency signal levels have been averaged over a shorter time period than the slow negative and positive frequency signal levels. The fast negative and positive frequency signal levels are therefore affected by short bursts or pulses that are effectively filtered from the slow negative and positive frequency signal levels. However, the slow negative and positive frequency signal levels suffer from a delay due to averaging. A combination of slow and fast level detection leads to improved level indication signal for IQC error detection.

The level selection circuit 1500*b* in FIG. 15*b* comprises logic circuitry 1503*b* that differs from the logic circuitry 1503*a* described above with reference to FIG. 15*a* in that the first and second three-input AND gates are replaced by corresponding first and second five-input AND gates 1532*b*, 1534*b*. The additional terminals of the five-input AND gates 1532*b*, 1534*b* are connected to third and fourth comparison outputs 1526*c*, 1530*c* of the third and fourth comparators 1522*c*, 1528*c* of the second, slow path, 1501*c*.

The level selection circuit 1500*b* supplies the mismatch detectors with information on proper signal conditions in the different bands. If the level detection is slow, with large time constants, the detected level is quite stable, but because of the latency, information for fast changing signals constellations could be too old, could lead the IQ error detectors summing up IQ error information for the wrong band or detect inappropriate signals.

FIG. 16 illustrates a time slicing profile for an IQ mismatch correction module with a sequential processing architecture. The sequential processing architecture may be implemented using time division multiplexing in which the bandpass filter input signal is divided into a plurality of up to n slices 1600*a-n*, which may have different sizes. Each slice 1600*a-n* is provided to the bandpass filter and to the phase and amplitude mismatch detector in real-time. A controller is provided in such an IQ mismatch correction module in order to set the bandpass filter to filter a different sub-band of the bandpass filter input signal for each of the n slices in order that the bandpass filter and phase and amplitude mismatch detector together provide phase and amplitude mismatch coefficients for each of a plurality of n sub-bands.

The mismatch detection period for a particular sub-band may be shortened or optimized if the mismatch coefficients or correction value are found to be within a predefined limit over a predetermined time period. If the determined mismatch coefficients and thus the resultant IRR is within the predefined limit, the determination of coefficients for the next sub-band may be started. Such a scheme enables the IQ mismatch correction module to react more quickly to changing signal conditions.

FIG. 17 illustrates a portion of a controller 1700 for determining when to set a bandpass filter of a mismatch detection module to pass a different sub-band to a current sub-band. The portion of a controller 1700 is configured to provide a change sub-band signal in response to the phase mismatch coefficient changing less than a predetermined phase mismatch change value in a predetermined time period and the amplitude mismatch coefficient changing less than a predetermined amplitude mismatch change value in the predetermined time period.

In the example shown in FIG. 17, the portion of the controller 1700 comprises an amplitude difference determining unit 1702, a phase difference determining unit 1704, counting circuitry 1706 and logic circuitry 1708.

The amplitude difference determining unit 1702 comprises a first register 1708 and a second register 1710. Each register has a data input D, a reset terminal R and an output Q. An amplitude maximum signal block 1712 provides the greater of a signal at the output Q of the first register 1708 and the amplitude coefficient from the phase and amplitude mismatch detector to the data input D of the first register 1708. An amplitude minimum signal block 1714 provides the lesser of a signal at the output Q of the second register 1710 and the amplitude coefficient from the phase and amplitude mismatch detected to the data input D of the second register 1710. A first adder 1716 receives the signal at the output Q of the first register 1708 at an addition input and the output Q of the second register 1710 at a subtraction input. A first comparator 1718 receives the result determined by the first adder 1716 at an inverting input. The first comparator 1718 receives an amplitude threshold indicative of a predetermined amplitude mismatch change at a noninverting input.

The phase difference determining unit 1704 comprises a third register 1720 and a fourth register 1722. Each register has a data input D, reset terminal R and an output Q. A phase maximum signal block 1724 provides the greater of a signal at the output Q of the third register 1720 and the phase coefficient from the amplitude and phase mismatch detector to the data input D of the third register 1720. A phase minimum signal block 1726 provides the lesser of a signal at the output Q of the fourth register 1722 and the phase coefficient from the amplitude and phase mismatch detected to the data input D of the fourth register 1722. A second adder 1728 receives the signal at the output Q of the third register 1720 at an addition input and the output Q of the fourth register 1722 at a subtraction input. A second comparator 1730 receives the result determined by the second adder 1728 at an inverting input. The second comparator 1730 receives a phase threshold indicative of a predetermined phase mismatch change at a noninverting input.

The counting circuitry 1706 comprises a counter configured to count up to a window size, N. Once the counter reaches the window size N it provides a signal at a counter output and resets itself. The signal at the counter output resets the registers 1708, 1710, 1720, 1722 of the amplitude and phase difference determining units 1702, 1704

The logic circuitry comprises the equivalent of a three-input AND gate that receives inputs from the output of the counting circuitry 1706, the first comparator 1718 of the amplitude difference determining unit 1702 and the second comparator 1730 of the phase difference determining unit 1704.

FIG. 18 illustrates an amplitude mismatch coefficient 1802 generated by an amplitude mismatch detector as a function of time. An amplitude threshold 1804 for use in the controller of FIG. 17 is also illustrated in FIG. 18. The amplitude threshold 1804 is indicative of a predetermined amplitude mismatch change below which the amplitude mismatch coefficient is considered to have settled on a value. The controller of FIG. 17 progresses through a number of counter cycles 1806 before the amplitude mismatch coefficient 1802 settles within the amplitude threshold 1804. If the controller were to set the bandpass filter of the mismatch detection module to filter the next sub-band at the end of the fourth counter cycle 1808, which is the first cycle in which the amplitude mismatch coefficient 1802 is within the amplitude threshold 1804, rather than at a predetermined fixed period 1810, then the iteration time of the IQ mismatch correction module is reduced, and so for a sequentially implemented architecture the module may be more responsive to fast changing signals.

As will be appreciated from the foregoing description, the separation of the mismatch detection module from the correction filter module means that the coefficients of the filter module are updated periodically, or intermittently, and so errors introduced during the settling time of the mismatch detection module do not affect the filter and perform other filter module.

As such, discreet changes in the filter coefficients occur from time to time. Such changes could result in step changes in the filter and may have an undesirable effect on the signal. In order to compensate for such step changes, filter coefficient interpolation may be performed.

FIG. 19 illustrates a filter coefficient smooth update interpolation unit 1900. This block is not to be confused with interpolation performed by the interpolation/extrapolation unit of the mismatch detection module described previously with reference to FIG. 9, and described further below with reference to FIGS. 22 and 23 or with the correction filter interpolation matrix.

The filter coefficient smooth update interpolation unit 1900 has a first input 1902, second input 1904 and an output 1906. The first input 1902 is configured to receive new values of the filter coefficients from the transformation module described previously with reference to FIGS. 5, 8 and 9. The output 1906 is configured to provide filter coefficients to the filter module described previously with reference to FIGS. 5, 8 and 9. The second input 1904 also receives the filter coefficients from the output 1906 in a feedback loop.

FIG. 20 illustrates signals associated with the filter coefficient interpolation unit of FIG. 19 for a particular filter coefficient. The filter coefficient has a new value 2002 and an old value 2004. The new value 2002 is different from the old value 2004. In order to apply a change in the value of the filter coefficient to the filter module, the filter coefficient interpolation unit performs linear interpolation between the old value 2004 and the new value 2002. The resultant filter coefficient 2006 at the output of the filter coefficient interpolation module increases linearly between the new and old values 2002, 2004 as a function of time. Other interpolation functions, such as a cosine, may be used instead of a linear function. The application of interpolation may reduce the disturbance that would be induced by applying a step change in the filter coefficients directly at the filter module at a calculation time $t_0$ of the new value 2002. Instead, the new value 2002 is applied at a later time $t_1$ following a ramping period between the old value 2004 and the new value 2002.

The interpolation/extrapolation unit of the mismatch detection module described previously with reference to FIG. 9 may be configured to select and discard sub-bands in order to provide interpolated or extrapolated coefficients as improved estimates of IQ errors in sub-bands, which do not yet contribute with reasonable signals (e.g. according to FIG. 15).

FIG. 21 illustrates a profile 2100 of filtered signal magnitude against frequency for a broad bandwidth signal comprising four sub-bands, each sub-band having a positive frequency and a negative frequency. A first sub-band comprises a first positive frequency signal $+f_1$ with a substantially higher magnitude than a corresponding negative frequency signal $-f_1$. A second sub-band comprises a second positive frequency signal $+f_2$ with a magnitude that is similar to that of a corresponding second negative frequency signal $-f_2$. A third sub-band comprises a third negative frequency signal $-f_3$ that is substantially higher than a corresponding third positive frequency signal $+f_3$. A fourth sub-band comprises fourth positive and negative frequency signals $+f_4, -f_4$ with a low magnitude.

Discarded signals 2102 and selected signals 2104 are identified in FIG. 21. In some examples, a mismatch detection module may be configured to base interpolated or extrapolated values on coefficients of positive frequency components in sub-bands in which the negative frequency components are relatively low, or vice versa. The mismatch detection module may also be configured to discard the coefficients from sub-bands in which the positive and negative frequency components are of a similar amplitude, or both of a low amplitude. Two amplitudes or magnitudes may be considered to be similar to each other when they differ by less than the threshold level. An amplitude or magnitude may be considered to be low if it is equal to or less than the threshold level.

FIG. 22 illustrates a profile 2200 of the amplitude mismatch coefficients, determined by an amplitude and phase mismatch detector as previously discussed with reference to FIG. 21, against frequency for a broad bandwidth signal comprising four sub-bands. Each sub-band has a positive frequency and a negative frequency. The profile 2200 comprises detected amplitude mismatch coefficients 2202 at a first positive frequency $+f_1$ and a third negative frequency $-f_3$. Missing (or discarded) frequencies 2204 within the bandwidth at second, third and fourth positive frequencies $f_2, f_3, f_4$ and first, second and fourth negative frequencies $-f_1, -f_2, -f_4$ can be calculated by applying a curve fit interpolation using an interpolation/extrapolation unit of the mismatch detection module. In this way, the interpolation/extrapolation unit provides interpolated mismatch coefficients at the second, third and fourth positive frequencies $f_2, f_3, f_4$ and the first, second and fourth negative frequencies $-f_1, -f_2, -f_4$.

The interpolation or extrapolation function applied by the interpolation/extrapolation unit may be zero order or first order to reduce computational requirements.

FIG. 23 illustrates a profile of amplitude mismatch coefficients plotted against frequency for a broad bandwidth signal comprising four frequency bands according to FIG. 21. As in the example described with reference to FIG. 22, the profile 2300 comprises detected amplitude mismatch coefficients 2302 at a first positive frequency $+f_1$ and a third negative frequency $-f_3$. In this example, interpolated mismatch coefficients at third positive frequencies $f_3$ and first negative frequencies $-f_1$ are calculated by an interpolation/extrapolation unit substituting missing (or discarded) positive coefficient values 2304 with the corresponding detected negative coefficient values, and vice versa. The effect of the substitution is that the coefficient values are mirrored about the vertical axis. The remaining missing mismatch coefficients at second and fourth positive frequencies $f_2$, $f_4$ and second and fourth negative frequencies $-f_2$, $-f_4$, may be interpolated as described for FIG. 22.

FIG. 24 illustrates an IQC bandpass filter bank profile 2400. The filter bank profile comprises filters for defining a plurality of sub-bands with positive and negative frequencies, including a first sub-band 2402a, 2402b, a second sub-band 2404a, 2404b, a third sub-band 2406a, 2406b and a fourth sub-band 2408a, 2408b. The plurality of sub-bands have arbitrary mid frequencies and bandwidths. As such, implementations of the band-pass filters described herein need not have equidistant frequency midpoints and so may afford a high degree of flexibility to the receiver design. The first sub-band 2402a, 2402b and fourth sub-band 2408a, 2408b have broader bandwidths than the second sub-band 2404a, 2404b and third sub-band 2406a, 2406b. To obtain a pulse response for the FIR correction filter from the IQ errors in the frequency domain, the application of an IDFT is not suitable here, because the IDFT requires equidistant frequency points, which is not given here.

The construction of the filter coefficients from determined mismatch coefficients requires generation of an FIR filter that has the given transfer at the given frequency positions given a number of transfer coefficients at arbitrary, given frequency positions. The mismatch coefficients are assumed to be complex values, and the FIR filter may be likewise a complex filter.

The transfer coefficients are given at frequency positions, that is, they are given on the unit circle in the z domain. The frequency response of the target FIR filter is periodic when viewed as a function of the position on the unit circle. Thus, the problem of generating filter coefficients from mismatch coefficients can be split into two parts: first, to find a periodic interpolation through the given (transfer, transfer coefficient) pairs, and second, to convert this interpolation function into FIR coefficients.

The second part of the problem is greatly reduced by choosing a suitable form of interpolation. As the FIR filter has periodic transfer function, periodic functions may be used as a basis for the interpolation. Thus, the basis used for interpolation is the doubly infinite sequence:

$$[\ldots e^{-4\pi i f/f_0}\ e^{-2\pi i f/f_0}\ 1\ e^{2\pi i f/f_0}\ e^{4\pi i f/f_0} \ldots],$$

where $f_0$ is the sample rate used. Thus, the interpolation is done with the Fourier basis of functions, and expressing the interpolation function with respect to this basis is merely a Fourier transform. This helps the translation to FIR coefficients, as for a FIR filter, the filter coefficients are equal to the impulse (any filter in the discrete time domain has a periodic transfer) response, which is in turn equal to the Fourier transform of its transfer function. Thus, by choosing the elementary periodic functions to do the interpolation, the Fourier transform that is necessary to obtain the filter coefficients is automatically executed, and the FIR filter coefficients are simply the main result of the interpolation itself. In other words, the second part of the problem may be solved by taking the interpolation coefficients, and using them straightforwardly as FIR filter coefficients.

This leaves the first part of the problem to be solved, as follows. Without loss of generality, we may assume the number of interpolation points to be odd, and the interpolation function to be of the following form $$h(f) = \sum_{k=-n}^{n} c_k e^{2\pi i k f/f_0}$$

The complex numbers $c_k$ are the interpolation coefficients to be found. The interpolation function must satisfy the given (frequency, transfer coefficient) pairs. For each pair of given frequency and transfer coefficient $(f_m, h_m)$ this leads to the following equation $$h_m = \sum_{k=-n}^{n} c_k a_{m,k}$$

where the numbers $a_{m,k}$ are defined as $a_{m,k}=e^{2\pi i k f_m/f_0}$. The equations were written this way to show that the numbers $a_{m,k}$ are given, and thus form an known matrix of numbers A. Collecting all equations into a vector form, it is easy to see that the resulting vector equation is $\vec{h}=A\vec{c}$, and thus that the interpolation coefficients $c_k$ can be found by calculating $\vec{c}=A^{-1}\vec{h}$.

If the frequency positions $f_m$ are known up-front, the inverse matrix $A^{-1}$ can be calculated off-line. In that case, the only calculation to be executed by the system is a standard matrix multiplication. The matrix multiplication executes a transform between function bases, which effectively combines the operations of interpolation and Fourier transform.

One freedom of design is the sample rate. If the sample rate is too tight, the transfer function has a steep part around $\pm\frac{1}{2}f_0$, leading to oscillations in the interpolated transfer function similar to the Gibbs phenomenon. In such cases, it may be helpful to increase the sample rate, so as to reduce the steepness around $\pm\frac{1}{2}f_0$.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An IQ mismatch correction module for a radio receiver, the IQ mismatch correction module comprising:
   an input terminal configured to receive an input signal;
   an output terminal configured to provide a filtered output signal;
   a mismatch detection module including circuitry comprising:
      a plurality of bandpass filters, each being configured to receive, from the input terminal or output terminal, a bandpass input signal and to select and to pass a respective one of a plurality of sub-bands of the bandpass input signal to provide respective bandpass filtered signals;
      one or more amplitude and phase mismatch detectors configured to determine amplitude and phase mismatch coefficients based on the bandpass filtered signals from the plurality of sub-bands and to cyclically generate the amplitude and phase mismatch coefficients and provide settled integrated amplitude and phase mismatch coefficients during each cycle, wherein each cycle starts following the determination of the settled amplitude and phase mismatch coefficients;
      a transformation unit, including circuitry, configured to apply a transformation to the amplitude and phase mismatch coefficients to provide correction filter coefficients for at least a respective one of the plurality of sub-bands; and
   a filter module, including circuitry, configured to:
      receive the filter coefficients for the plurality of sub-bands from the mismatch detection module; and
      filter the input signal in accordance with the received filter coefficients to provide the filtered output signal.

2. The IQ mismatch correction module of claim 1, comprising:
   a plurality of amplitude and phase mismatch detectors configured to receive, in parallel, the respective bandpass filtered signals, each of the amplitude and phase detection units is configured to determine amplitude and phase mismatch coefficients based on the bandpass filtered signals from a respective sub-band of the plurality of sub-bands.

3. The IQ mismatch correction module of claim 1, wherein the filter module is configured to be updated periodically based on filter coefficients based on settled mismatch coefficient values.

4. The IQ mismatch correction module of claim 3, in which the one or more amplitude and phase mismatch detectors are configured to start a new cycle in response to determination of the settled amplitude and phase mismatch coefficients.

5. The IQ mismatch correction module of claim 3, in which the one or more amplitude and phase mismatch detectors are configured to amplify differences prior to integration and the one or more amplitude and phase mismatch detectors are configured to decrease a gain of the amplification following initiation of an integration cycle.

6. The IQ mismatch correction module of claim 3, in which the mismatch detection module is configured to calculate a series of filter coefficients based on the settled mismatch coefficient values from one cycle and the settled mismatch coefficient values from the following cycle.

7. The IQ mismatch correction module of claim 1, in which the amplitude and phase mismatch detectors are configured to use determined amplitude and phase mismatch coefficients, or related values, from a previous cycle when determining the amplitude and phase mismatch coefficients for the plurality of sub-bands in a current cycle.

8. The IQ mismatch correction module of claim 1, in which the mismatch detection module comprises one or more automatic gain controllers that are configured to apply a gain factor to the bandpass filtered signals and to provide gain corrected bandpass filtered signals to the one or more amplitude and phase mismatch detectors.

9. The IQ mismatch correction module of claim 1, in which the mismatch detection module comprises an interpolation/extrapolation unit configured to receive the amplitude and phase mismatch coefficients and to determine further amplitude and phase mismatch coefficients by interpolating and/or extrapolating values based on the received amplitude and phase mismatch coefficients.

10. The IQ mismatch correction module of claim 1, in which:
   the mismatch detection module comprises level detection circuitry or clipping detection circuitry configured to identify positive or negative frequencies associated with a sub-band that contain useful information, in which the mismatch detection module generates filter coefficients based on the identified positive or negative frequencies.

11. The IQ mismatch correction module of claim 1, comprising a processor and memory storing computer program code executable by the processor to provide the functionality of the mismatch detection module and filter module.

12. A radio frequency receiver comprising the mismatch correction module of claim 1.

13. The IQ mismatch correction module of claim 1, wherein the filter module is further configured and arranged to be periodically updated based on the settled amplitude and phase mismatch coefficients received from the mismatch detection module.

14. The IQ mismatch correction module of claim 1, wherein the bandpass input signal is a feedforward or feedback signal, including either the input signal from the input terminal or the filtered output signal from the output terminal.

15. The IQ mismatch correction module of claim 1, wherein the input signal is a zero-IF (intermediate frequency) signal and each of the plurality of subbands includes signals respectively corresponding to positive and negative frequencies.

16. The IQ mismatch correction module of claim 1, wherein each of the plurality of subbands includes signals respectively corresponding to frequencies at either a first magnitude or a second magnitude that is greater than the first magnitude.

17. A method of correcting an IQ mismatch in an input signal, the method comprising:
receiving the input signal;
selecting and bandpass filtering sub-bands of the input signal or a filtered output signal to provide respective bandpass filtered signals from a plurality of sub-bands using a plurality of bandpass filters;
determining amplitude and phase mismatch coefficients based on the bandpass filtered signals from the plurality of sub-bands;
cyclically generating the amplitude and phase mismatch coefficients and provide settled integrated amplitude and phase mismatch coefficients during each cycle, wherein each cycle starts following the determination of the settled amplitude and phase mismatch coefficients;
applying a transformation to the amplitude and phase mismatch coefficients to provide filter coefficients for the plurality of sub-bands; and
filtering the input signal in accordance with the filter coefficients for the plurality of sub-bands to provide a filtered signal.

18. A non-transient computer-readable storage medium comprising computer program code configured to enable a processor to perform the method of claim 17.

* * * * *